United States Patent
Uchida

(10) Patent No.: US 7,373,593 B2
(45) Date of Patent: May 13, 2008

(54) APPARATUS AND METHOD FOR AUTOMATICALLY SETTING CONSTRAINTS WITHIN A DOCUMENT LAYOUT

(75) Inventor: Takayuki Uchida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/190,872

(22) Filed: Jul. 28, 2005

(65) Prior Publication Data

US 2006/0031773 A1    Feb. 9, 2006

(30) Foreign Application Priority Data

Aug. 6, 2004   (JP) ............................. 2004-231426

(51) Int. Cl.
*G06F 15/00*  (2006.01)
*G06F 17/00*  (2006.01)

(52) U.S. Cl. ....................... 715/508; 715/518
(58) Field of Classification Search ................ 715/508, 715/518
See application file for complete search history.

(56) References Cited

U.S. PATENT DOCUMENTS

| | | | |
|---|---|---|---|
| 5,432,897 A | | 7/1995 | Tatsumi et al. |
| 5,437,008 A | * | 7/1995 | Gay et al. .................... 715/502 |
| 5,577,189 A | * | 11/1996 | Gay et al. .................... 715/800 |
| 5,615,367 A | * | 3/1997 | Bennett et al. .............. 707/102 |
| 5,745,122 A | * | 4/1998 | Gay et al. .................... 345/619 |
| 5,845,303 A | * | 12/1998 | Templeman ................. 715/517 |
| 5,987,480 A | | 11/1999 | Donohue et al. |
| 6,052,486 A | * | 4/2000 | Knowlton et al. ........... 382/232 |
| 6,057,842 A | * | 5/2000 | Knowlton et al. ........... 715/788 |
| 6,717,587 B2 | * | 4/2004 | Felser et al. ................. 345/630 |
| 6,862,598 B2 | | 3/2005 | Higashigawa |
| 6,883,167 B1 | * | 4/2005 | Szewerenko et al. ....... 717/162 |
| 7,046,246 B2 | | 5/2006 | Saitou |
| 7,093,196 B1 | * | 8/2006 | Griffiths et al. ............. 715/518 |
| 7,257,253 B2 | | 8/2007 | Ozawa et al. |
| 2002/0032546 A1 | * | 3/2002 | Imamura et al. ............... 703/1 |
| 2002/0049702 A1 | | 4/2002 | Aizikowitz et al. |
| 2003/0229845 A1 | | 12/2003 | Salesin et al. |

(Continued)

FOREIGN PATENT DOCUMENTS

JP          05-307476          11/1993

(Continued)

OTHER PUBLICATIONS

Douglas Gennetten et al., "Photo and Imaging Document Template File Format" Research Disclosure, Mason Publications, Hampshire, GB, vol. 478, No. 27, Feb. 2004, XP007133381, ISSN: 0374-4353.

*Primary Examiner*—Doug Hutton
*Assistant Examiner*—Henry Orr
(74) *Attorney, Agent, or Firm*—Fitzpatrick Cella Harper & Scinto

(57) ABSTRACT

A user can efficiently perform a setting operation in an automatic layout system. An information processing apparatus having an automatic layout function includes a function for, in editing containers, measuring a distance between a first container placed on the document and a second container placed on the document, determining whether or not the distance is equal to or shorter than a predetermined distance, and if the distance is determined to be equal to or shorter than the predetermined distance, automatically setting the link between the first and second containers.

30 Claims, 34 Drawing Sheets

U.S. PATENT DOCUMENTS

| | | | |
|---|---|---|---|
| 2005/0055635 A1* | 3/2005 | Bargeron et al. | 715/525 |
| 2005/0094207 A1* | 5/2005 | Lo et al. | 358/1.18 |
| 2005/0132283 A1* | 6/2005 | Diwan et al. | 715/517 |
| 2005/0172225 A1 | 8/2005 | Kobashi et al. | |
| 2005/0172226 A1 | 8/2005 | Kobashi et al. | 715/518 |
| 2005/0179947 A1 | 8/2005 | Kobashi et al. | |
| 2006/0031773 A1* | 2/2006 | Uchida | 715/760 |

FOREIGN PATENT DOCUMENTS

| | | |
|---|---|---|
| JP | 06-028442 | 2/1994 |
| JP | 6-052243 | 2/1994 |
| JP | 06-282617 | 10/1994 |
| JP | 7-129658 | 5/1995 |
| JP | 11-175573 | 7/1999 |
| JP | 2000-276608 | 10/2000 |
| JP | 2002-276608 | 10/2000 |
| JP | 2002-288223 | 10/2002 |
| JP | 2005-216179 | 8/2005 |
| JP | 2005-216180 | 8/2005 |
| JP | 2005-242992 | 9/2005 |
| KR | 1999-0034152 | 5/1999 |
| KR | 2001-0112686 | 12/2001 |
| KR | 2002-0050295 | 6/2002 |
| KR | 2004-00002427 | 1/2004 |

* cited by examiner

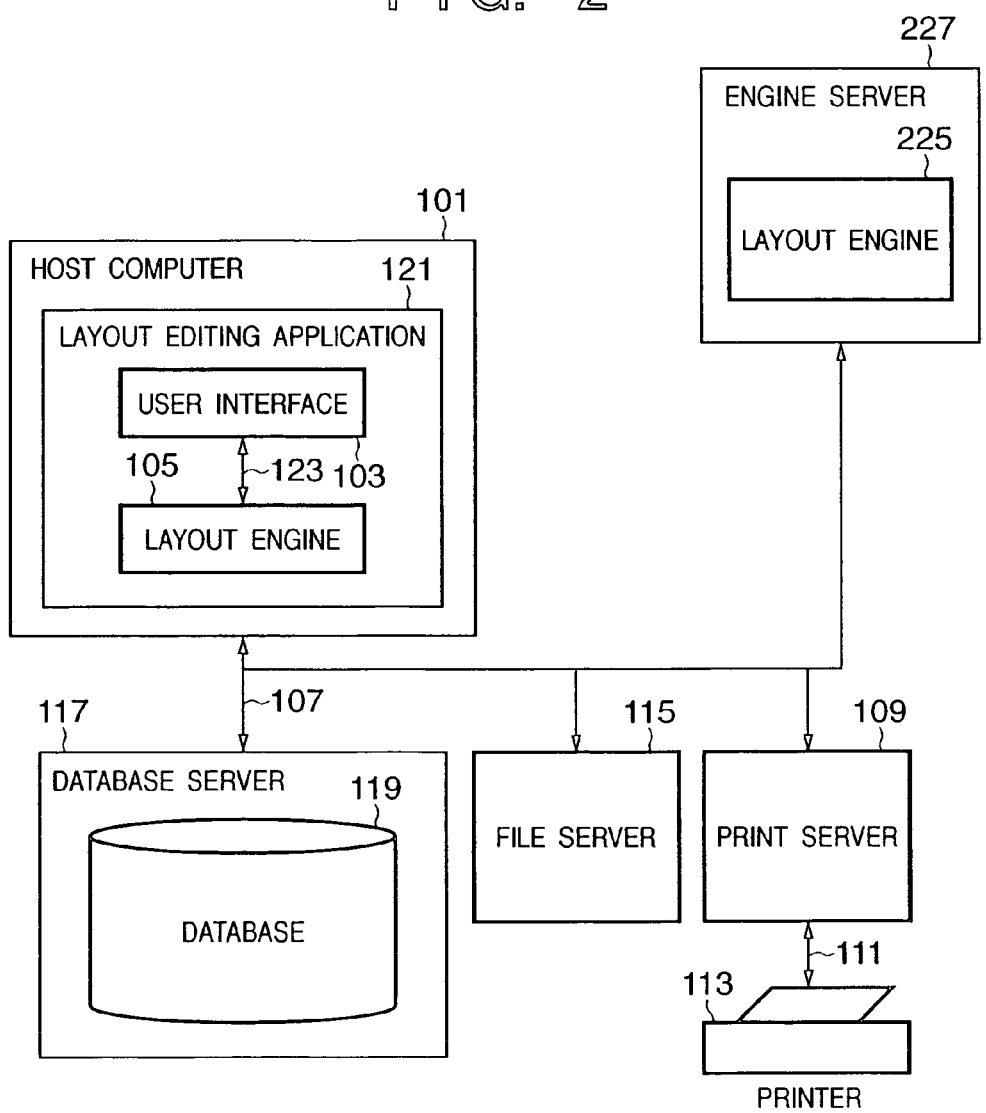

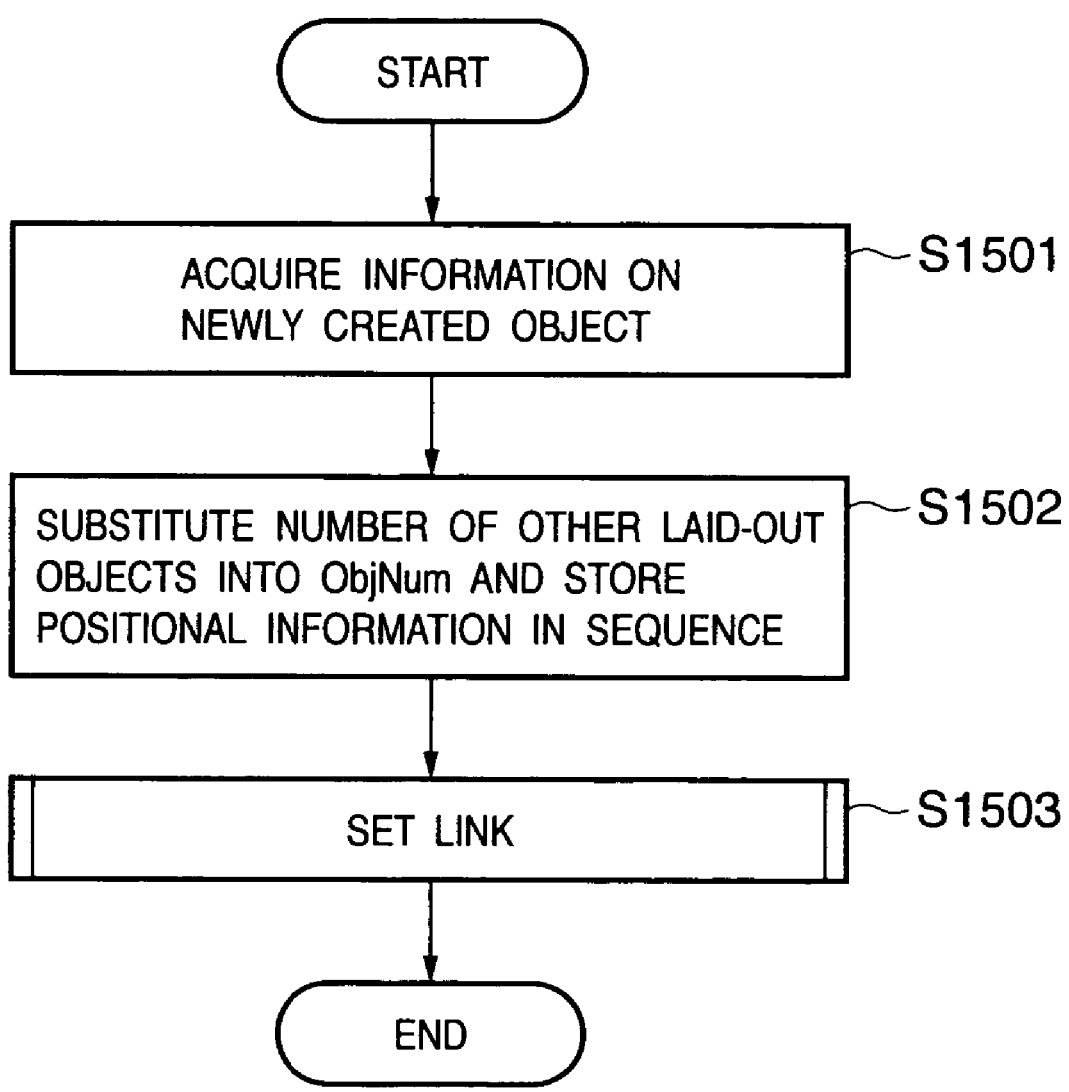

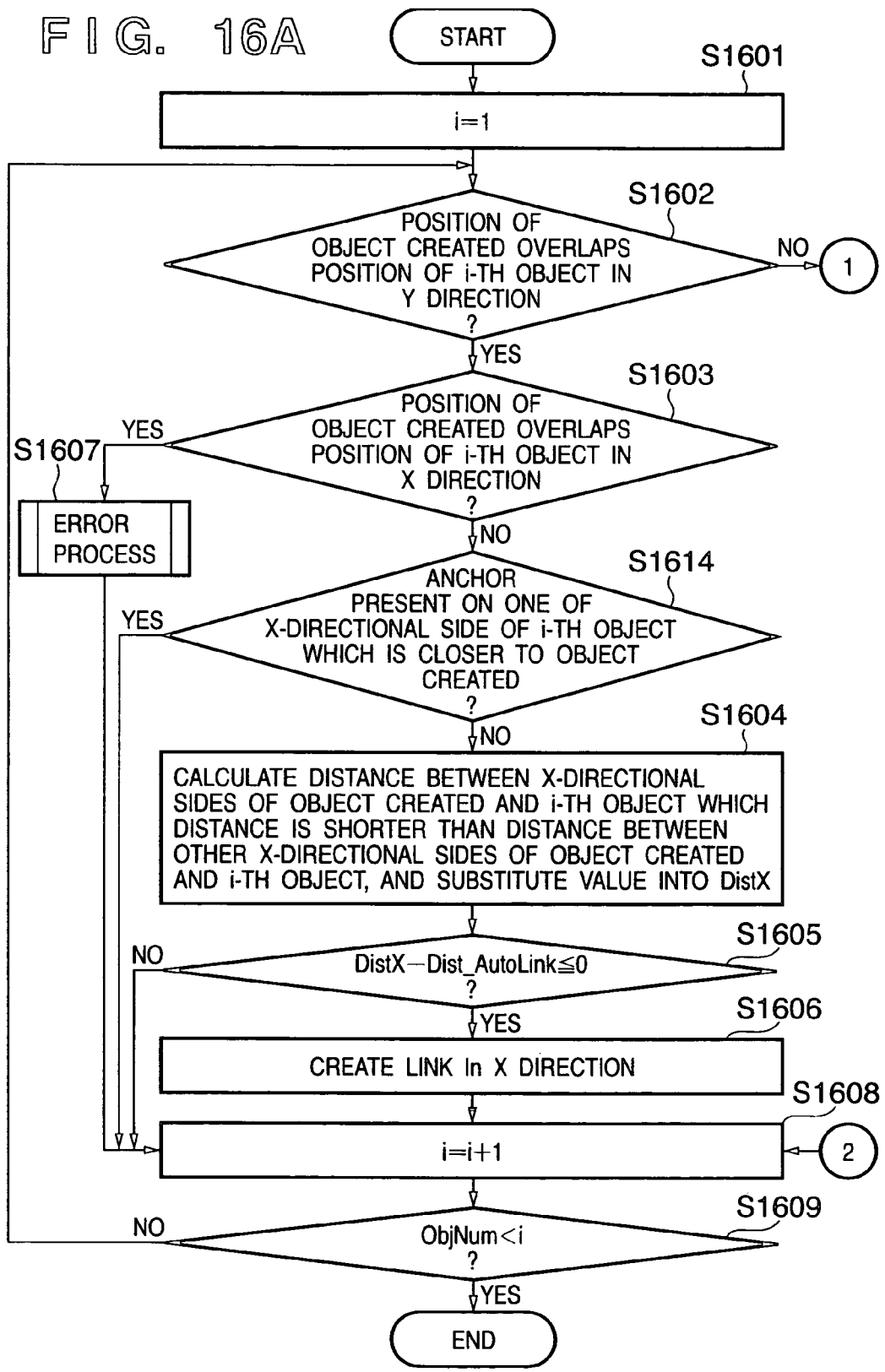

APPARATUS AND METHOD FOR AUTOMATICALLY SETTING CONSTRAINTS WITHIN A DOCUMENT LAYOUT

FIELD OF THE INVENTION

The present invention relates to an information processing technique for setting control conditions for the layout of a plurality of objects on a document in an information processing apparatus which generates a document by pouring data into the objects and controlling the layout of the objects under predetermined control conditions according to the data.

BACKGROUND OF THE INVENTION

In recent years, much attention has been paid to the need of CRM (Customer Relationship Management) and One-to-One marketing. This is because decreases in the lifetimes of products result from an increase in the number of product types and because customers' orientation toward customized services attributed to the prevalence of the Internet. The above techniques are very effective in accomplishing objects to improve customers' satisfaction and to get and hold new customers.

One-to-One marketing is a kind of database marketing in which customers' individual attribute information such as ages, sexes, habits, tastes, and purchase histories is stored in a database so that the contents of the information can be analyzed to make proposals meeting the customers' needs. A representative technique for one-to-one marketing is variable print. With the recent development of the DTP (Desk Top Publishing) technique and prevalence of digital printing apparatuses, a variable print system has been developed which outputs a customized document for each customer. It has thus become necessary to optimally lay out contents the amount of which varies with customers.

In general, when such a customized document is created using a variable print system, containers are laid out on the document. The container is an object that is a partial region (sometimes referred to as a field region) in which contents (drawn contents) from the database are drawn. That is, a customized document is created by laying out containers and associating the database with the containers (associating the contents of the database with the containers).

However, with the variable print system, the sizes of containers for texts and images are fixed. Accordingly, when data from the database is inserted into a container, if the amount of data is larger than the size of the container, text overlapping or image clipping may occur. If the data amount is smaller than the container size, a gap may disadvantageously be formed in the container.

To solve this problem, an automatic layout system has been proposed. The automatic layout system dynamically changes the layout of containers using contents. The automatic layout system can set a flexible container size according to the amount of data in an inserted text or image.

Specifically, the automatic layout system can vary the size of containers and increase the size of containers to be laid out according to the amount of data inserted. For texts, the automatic layout system can vary the sizes of fonts in containers and reduce the size of the font to be laid out according to the amount of data inserted. Thus, even if a text having a data amount exceeding the capacity of a container is inserted into the container, the entire text can be displayed in the container.

However, with the flexible container size, a container with a large data amount may be laid on top of another container on the same document. In other cases, when the sizes of containers are fixed with the sizes of fonts varied, a text with a large data amount may result in an excessively reduced font size in the layout.

Thus, the automatic layout system comprises a link function for associating adjacent containers with each other (function for associating adjacent objects so that the layout of an object obtained by pouring data into the objects is based on the layout of another object adjacent to this object). This solves the above problem by automatically increasing the size of a container adjacent to a particular container of an increased size (see, for example, Japanese Patent Laid-Open No. 7-129658).

However, with the automatic layout system, when a plurality of containers are arranged on a document and associated with one another, a user must manually set each link between the corresponding containers. However, with the one-to-one marketing, catalogs or pamphlets are created according to clients' needs, so that much information is required for some clients. It is thus expected that the number of links associating containers with one another increases consistently with the number of containers into which contents are poured. In this case, an increase in setting burden may disadvantageously result from the manual setting of each link associating containers with one another as with the above technique.

SUMMARY OF THE INVENTION

The present invention is made in view of the above problems. An object of the present invention is to allow a user of a layout system to efficiently set links associating containers with one another, by automatically setting a link if a plurality of objects are contained within a predetermined distance preset by the user.

To accomplish this object, a method for processing information according to the present invention has the following configuration.

A method for processing information to set links that join a plurality of objects on a document in an information processing apparatus comprising a control unit configured to use the links to control a layout of the objects when data is poured into the objects, the method comprising:

a calculating step of calculating a distance between a first object placed on the document and a second object placed on the document;

a determining step of determining whether or not to create a link on the basis of the distance between the first and second objects calculated in the calculating step and a link creating step of, if the link is determined to be created, creating the link between the first and second objects.

The present invention enables the automatic setting of links associating a plurality of objects with one another. This allows the user to perform efficient operations in the automatic layout system.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a diagram showing the configuration of an automatic layout system comprising a host computer according to an embodiment of the present invention;

FIG. 15 is a flowchart showing the details of a link creating process executed when a new object is created;

FIG. 16A is a flowchart showing the detailed flow of a link setting process;

DETAILED DESCRIPTION OF THE PREFERRED EMBODIMENTS

First, the present embodiment will be described in detail. In general, creation of a document in an automatic layout system can be classified into a layout editing process and an automatic layout process. The former process is used to set control conditions as to how containers are laid out if the containers are arranged on a document and if data is poured into the containers. The latter process is used to generate a document by pouring data into containers and controlling the layout according to the poured-into data under the set control conditions.

A host computer (information processing apparatus) according to the present embodiment which constitutes an automatic layout system comprises an automatic link function for automatically executes link setting which is a set item of control conditions for the layout editing process in order to allow a user to perform efficient setting operation. Specifically, a conventional layout editing process arranges containers on a document and then sets each link between the corresponding containers. In contrast, with an automatic link function according to the present invention, links can be automatically set simply by arranging containers at most a predetermined distance from each other. This sharply reduces the burden imposed on the user in link setting.

1. Example of Configuration of Automatic Layout System

Figure 1A:
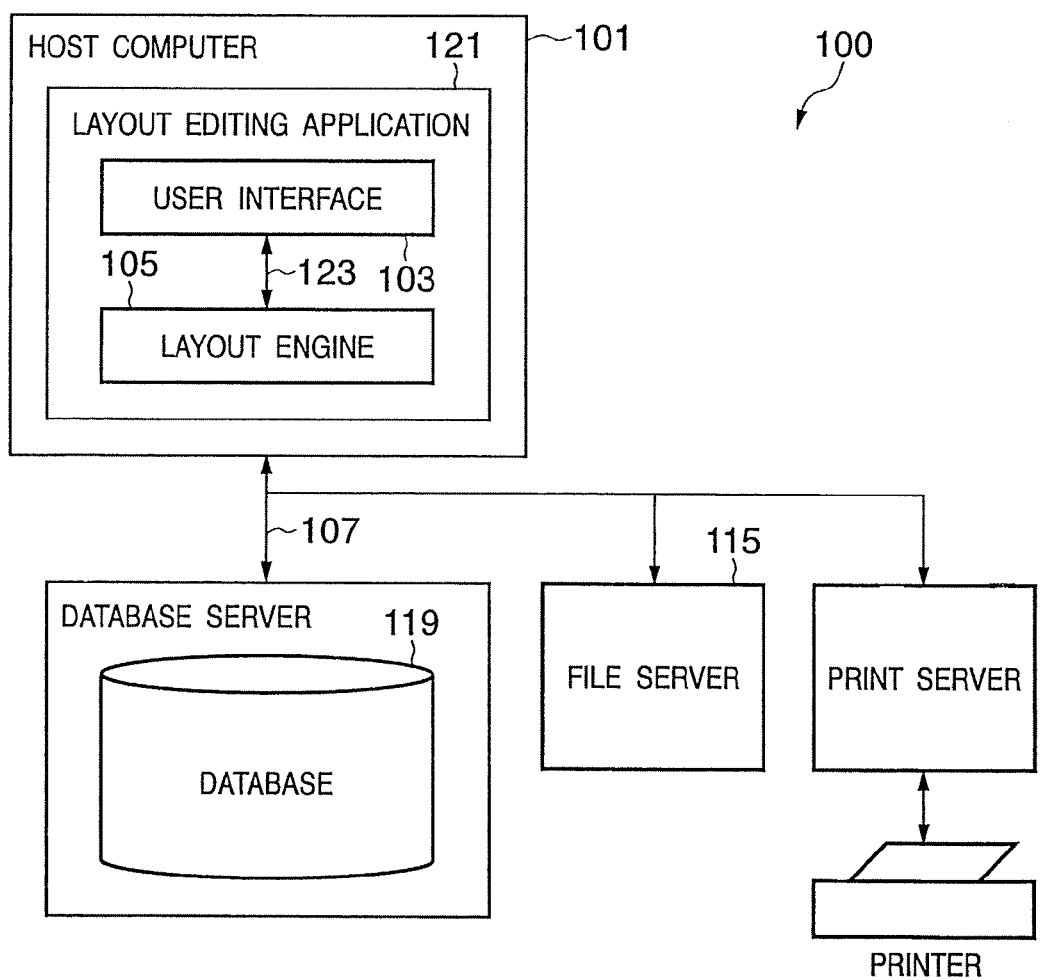
FIG. 1A is a diagram showing the configuration of an automatic layout system comprising a host computer according to an embodiment of the present invention.
Figure 1B:
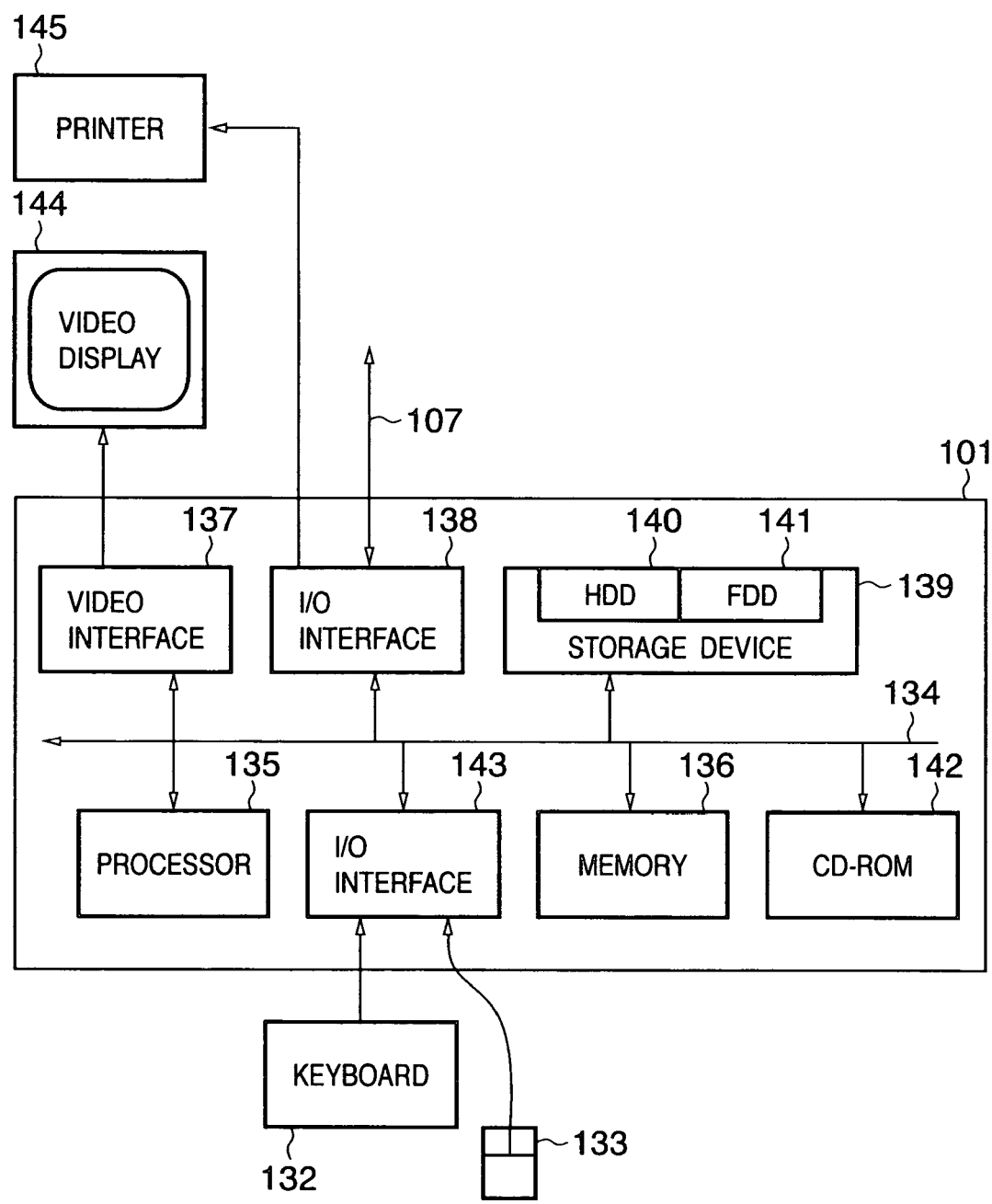
FIG. 1B is a block diagram showing in further detail the configuration of the automatic layout system comprising the host computer according to an embodiment of the present invention.

First, with reference to FIGS. 1A and 1B, description will be given of an automatic layout system comprising a host computer (information processing apparatus) according to an embodiment of the present invention. FIG. 1A is a block diagram showing an example of the configuration of an automatic layout system 100. FIG. 1B is a block diagram showing in further detail the configuration of a host computer (information processing apparatus) 101 shown in FIG. 1A.

The host computer 101 (composed of a general-purpose computer module) executes a layout editing process and an automatic layout process described in the present embodiment. The host computer 101 executes the whole or a part of the software for a layout editing application program 121 that can be implemented on the automatic layout system 100. This allows the layout editing process and automatic layout process to be implemented.

The layout editing application program 121 is stored in a computer readable medium and loaded from the computer readable medium into a memory 136 of the host computer 101 for execution. The computer readable medium housing such software and a computer program is a computer program product. Using the computer program in the computer provides an apparatus that is suitable for creation of a document or printing of the documented created.

As shown in FIG. 1B, the host computer 101 connects to a keyboard 132, a pointing device such as a mouse 133, and the like via an I/O interface 143, the keyboard and pointing device serving as input devices. Further, a display device 144 serving as an output device is connected to the host computer 101 via a video interface 137. Moreover, a local printer 145 or the like can be connected to the host computer 101 via an I/O interface 138. The I/O interface 138 also has a function for connecting the computer module 101 to a network 107. This enables the host computer 101 to be connected to another computer apparatus via the network. Typical examples of the network 107 include a local area network (LAN) and a wide area network (WAN).

Further, as shown in FIG. 1B, the host computer 101 includes at least one processor unit 135 and a memory unit 136 composed of, for example, a semiconductor random access memory (RAM) or a read only memory (ROM). A storage device 139 includes a hard disk drive 140 and a floppy (registered trade mark) disk drive 141 which can transmit data to and from a computer readable medium in which programs and the like are stored. Although not shown in FIG. 1B, a magnetic tape drive or the like can be used as the storage device 139. A CD-ROM drive 142 serves as a nonvolatile data source (of course, a CR-ROM may be used to provide computer programs).

The host computer 101 utilizes components 135 to 143 of the computer module 101 which make communications via an interconnect bus 134 using a conventional operation mode of an operating system such as GNU/LINUX or Microsoft Windows (registered trade mark) or typically a computer system formed so as to follow the operating system or using a known related technique. That is, the arrangements shown by 135 to 143 are communicatively connected via a bus 134 and utilized by the operating system installed in the host computer 101.

A possible example of the host computer 101, shown in FIG. 1B, is an IBC compatible PC, a SUN Sparcstation, or a computer system including such a computer.

In the present embodiment, the layout editing application program 121 resides in the hard disk drive 140. The processor 135 controls execution and loading of the layout editing application program 121. The semiconductor memory 136 is used, in association with the hard disk drive 140, for data fetched from a medium storage device for the layout editing application program 121 and from the network 107.

In one example, an encoded program in the layout editing application 121 is stored on a CD-ROM or a floppy (registered trade mark) disk. The program is loaded through the corresponding drive 142 or 141 and installed in the hard disk drive 140. In another example, the layout editing application program 121 may be loaded from the network 107 into the host computer 101 and then installed in the hard disk drive 140.

Moreover, the software may be loaded into the host computer 101 from a magnetic tape, a ROM, or an integrated circuit; or a magneto-optic disk, radio communication or the like between the host computer 101 and another device, a computer readable card such as a PCMCIA card, or another appropriate computer including the Internet or intranet having E mail communication or recoded information on WEB sites. They are examples of the computer readable medium and other computer readable media can apparently be used.

In the FIG. 1A the layout editing application 121 allows the computer to execute an automatic layout process and a layout editing process. The layout editing application 121 includes two software components, that is, a layout engine 105 and a user interface 103.

The layout engine 105 is a software component that executes the automatic layout process as described below in accordance with settings for the sizes and positions of objects (rectangular ranges, for example, containers) that are partial regions. The layout engine loads each record from the data stored in the database 119 one by one and calculates the sizes and positions of objects into which the loaded data is poured, on the basis of the loaded data and the settings for the objects. Further, in the present embodiment, the layout engine 105 further draws data assigned to the objects to generate an image of a document. However, the present invention is not limited to this. The layout engine 105 may operate as an application that determines the size and position of each partial region (object). The layout engine 105 may further output drawing information to a printer driver (not shown) so that the printer driver can execute an image drawing process on the document to generate print data.

On the other hand, the user interface 103 enables the user to execute a layout editing process. Specifically, the user creates and moves objects via the interface 103 to create a document template. The user interface 103 provides a mechanism that associates each object in the document template with data. The user interface 103 further enables various settings (including link settings) for each object in the document template. The user interface 103 and the layout engine 105 communicate via a communication channel 123.

2. Another Example of System Configuration

FIG. 2 is a block diagram similar to FIG. 1A except for the addition of an engine server 227. A layout engine 225 stored in the engine server 227 is a separate version of the layout engine 105. The engine server 227 is composed of a common computer. The layout engine 225 integrates a document template saved to a file server 115 with data saved to the database 119 to generate a document for printing or other purposes. Such an operation is requested via the user interface 103.

3. Description of Layout Editing Application

Description will be given below of the details of the layout editing process in the layout editing application 121, which is implemented via the user interface 103.

3-1 Main Window

Figure 3:
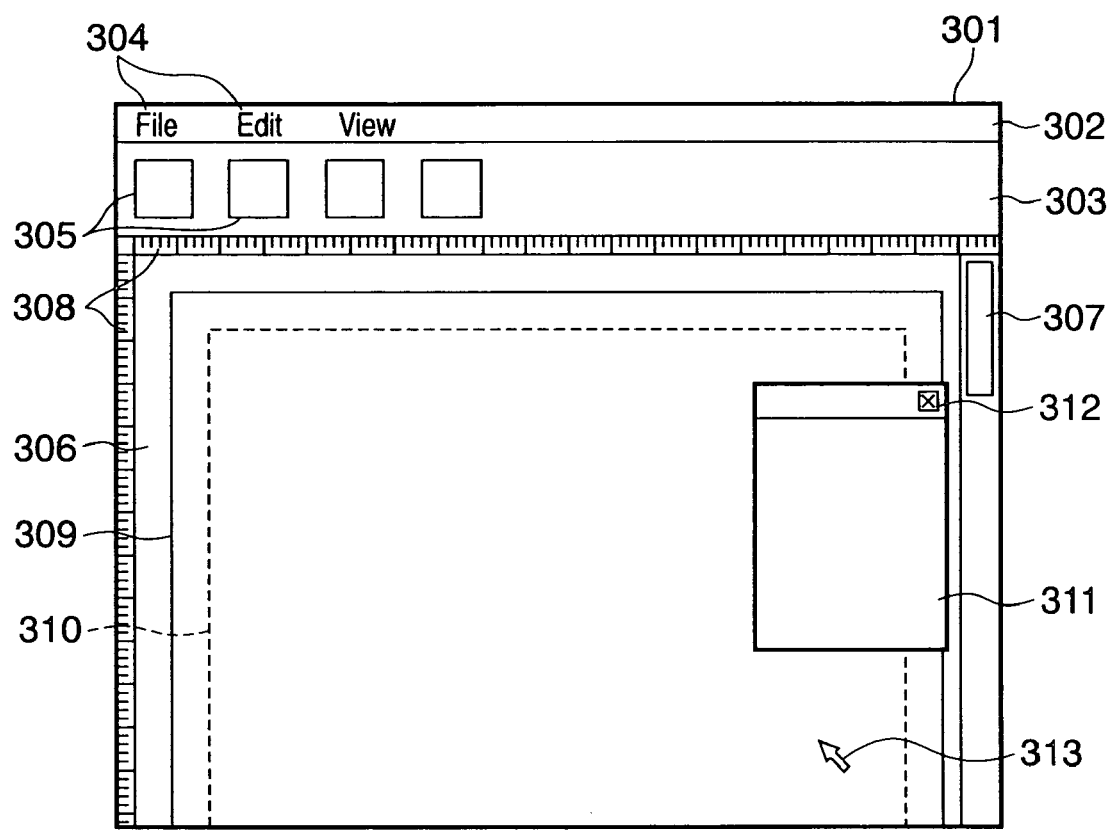
FIG. 3 is a diagram showing a main window of a layout editing application program.

The user interface 103 causes the video display 144 to display, during operation, a user interface screen formed of an application window 301 such as the one shown in FIG. 3. The window 301 has a menu bar 302, a tool bar 303, a work area 306, and an optional pallet 311. The window 301 enables the menu bar 302 and the tool bar 303 to be set in a non-display state and moved to various positions on the screen. Further, the position of the work area 306 can be moved by operating the mouse 133. The pallet 311 is optional, and the cursor/pointer device 313 shows a position pointed to by the mouse 133.

The menu bar 302 has a large number of menu items 304 expanded under a menu operation layer as known from the well-known technique.

The tool bar 303 has a large number of tool buttons and widgets 305 that can be set in a non-displayed or displayed state using a special mode of the application.

A ruler 308 is optional and is used to show the position of a pointer, a page, a line, a margin guide, and an object in a work area.

The pallet 311 has a window control 312 used for movement, resizing, and closure. The pallet 311 is optional and is displayed in front of the work area or hidden behind the objects. The pallet 311 may be displayed within the range of the application window 301 or may be partly or entirely displayed outside the application window 301.

Figure 4:
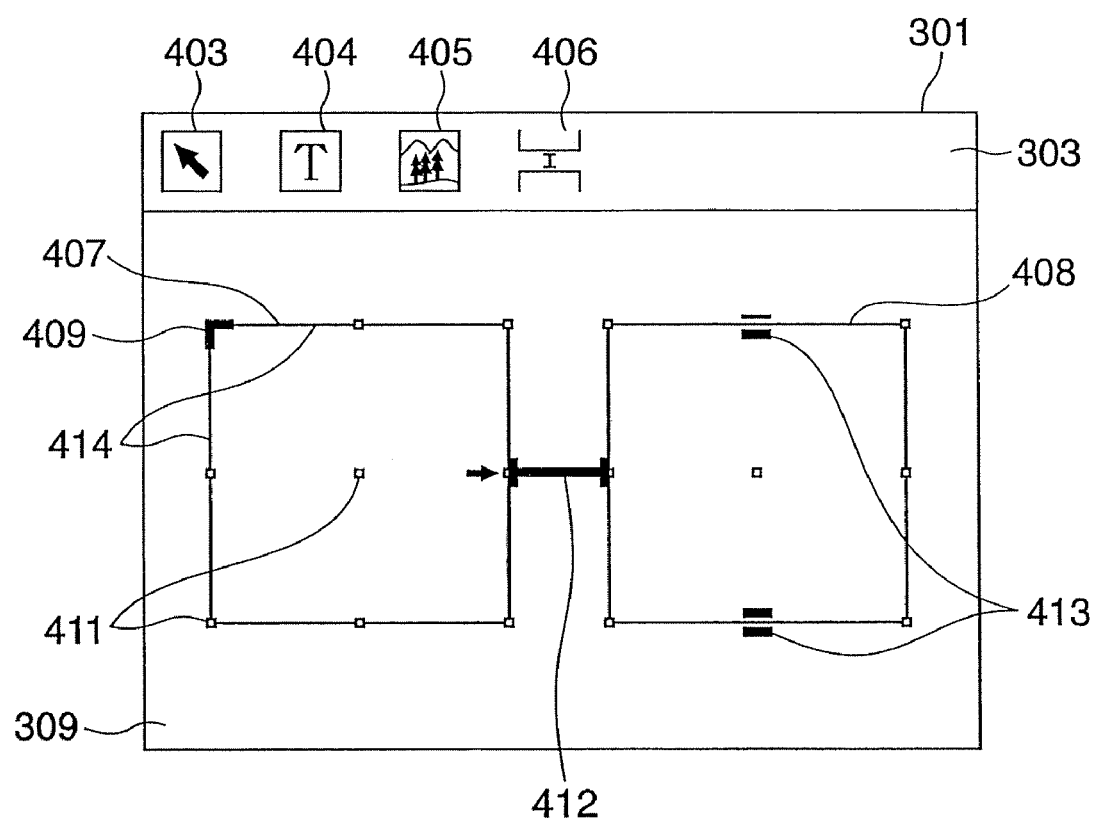
FIG. 4 is a diagram showing the main window of the layout editing application program.

"Buttons" such as those shown in FIG. 4 are arranged in the tool bar 303 so that the user can select any of the buttons.

(1) Selection tool button 403: Used to select, move, resize, and lock/unlock any side of an object. An object is selected by dragging a selection box around the object. A plurality of objects can also be selected by performing a selecting operation on the objects while depressing a CTRL key.

(2) Text object tool button 404: Used to create an object having a static or valuable text.

(3) Image object tool button 405: Used to create an object having a static or valuable image.

(4) Link tool button 406: Used to create a link between objects which associates the objects with each other and to control the distance of the link.

3-2 Document Template

In FIG. 3, the work area 306 is used to display and edit the design of a document template. This enables the user to design the appearance of a preprinted document.

The work area 306 comprises a scroll bar 307, the optional ruler 308, and a document template 309. The document template 309 can show the presence of a plurality of pages.

The user specifies a page size for the given document template. The actual number of pages in each document varies depending on the amount of data poured. When the data cannot be fitted into one page, an additional page is automatically created.

A boundary line 310 in each page is an arbitrary page margin indicating the maximum width of a printable object on the page.

Further, FIG. 4 shows an example of objects that can be displayed on the document template 309 for one page. The template has a plurality of objects 407 and 408, arbitrarily applicable anchor icons 409 and link 412, and a slider 413.

3-3 Object

Now, the object will be described. The object is a space (referred to as a partial region) drawn by pouring a fixed or flexible text/image from a data file into a document template. As shown in FIG. 4, the object is arranged in the document template together with other objects. The object is moved, resized, and re-created by the user by performing operations on a user interface screen to give instructions, that is, operating the mouse 133. The object will be defined below according to the present embodiment.

(1) The object has a fixed or flexible content. The flexible content is dynamic in a sense that data acquired from a data source may vary with documents, that is, records. However, the flexible content according to the present embodiment does not include an animated content or a content changing instantaneously using another method. The fixed content is similarly displayed in all the documents generated using objects. However, if any flexible content and link are set, the position of the fixed content may vary with the documents.

(2) The object has decorating functions similar to text settings such as a background color, a border, and a font style which are applied to the content. These settings are called object attributes. The object attributes can be set for each object. However, settings can be made such that an object has the same object attributes as those of another.

(3) The object is merged with data from the data source when a document is generated. The decorating functions are visible in printout matter as in the case of any fixed contents. The flexible content provides a displays particular data from the data source. This expression of the object may be printed and/or displayed on the screen of the video display 144.

(4) The object has a user interface as a visual clue as shown in FIG. 4. The object has, for example, an interactive graphical user interface (GUI) used to edit, display, and set objects. The elements of the GUI are displayed on the screen of the video display 144 but are not printed as a document. The user interface 103 of the layout editing application 121 has a function for displaying some of the object decorating functions such as a background color and a font and enabling object settings to be edited and displayed.

The user can specify the size and position of an object. The object has control restrictions (conditions) as to how to link contents displayed in each document. These restrictions (including the linkage of fixed/flexible contents with objects) are a major method by which the user controls a large number of documents from one document template.

The sides of an object define virtual boundary lines inside which the associated content is displayed in the document. Therefore, discussing the left-hand side of the object corresponds to discussing the leftmost side of an area in which the associated content can be displayed in each document. Likewise, discussing the height of an object corresponds to discussing restrictions on the height of the associated content in the document generated. In the present specification, this distinction will be clarified in the discussion of the sides or size of the object with reference to the user interface 103.

3-4 Method for Creating New Object

As shown in FIG. 4, a new text object or image object is created on the document template 309 by using the mouse 133 to click a text object tool 404 or an image object tool 405 and dragging a rectangle onto the document template 309.

Alternatively, an object may be created by activating the appropriate tool 404 or 405 and simply clicking it on the document template 309. In this case, an object of a default size is placed on the template in response to the click operation of the mouse 133. Further, a dialog box or another prompt is provided which is used to set, for example, the size of the new object. Various methods may be used to create an object; the size of the object may be automatically predefined or a calculated schema may create and place the object. The input device such as the mouse is used to select the object generated. A right click is executed to indicate properties. Then, an object property dialog is displayed so that restrictions on the object can be set. The above various restrictions can be set in the object property dialog UI. The object property dialog enables the size (width and height) and position of the object to be determined. To set a flexible size, it is possible to set a basic pattern (basic size and basis position) for the object as well as a maximum object size (width and height) and a minimum object size (width and height).

3-5 Method for Displaying Object

The application 121 displays the sides of an object as solid lines (414) (however, another method may be used to show the sides). The application 121 also comprises an anchor 409 (a line, shape, or icon drawn close to any of the sides), handles 411 (control points drawn to move or modify the sides), and sliders 413 (short parallel lines drawn on the opposite sides).

All these icons and sides may or may not be drawn depending on which of the tools or objects is selected, highlighted, or activated. In general, the sides and icons of the object only help design the document template and are thus not drawn on printed matter.

3-6 Link

The link indicates the association between the corresponding objects. Each of the objects associated with each other by the link calculate layout under the influence of a change in the layout of the other. The link is shown at 412 in FIG. 4 and associates the objects 407 and 408 with each other in this figure.

3-7 Method for Setting Link

Figure 7A:
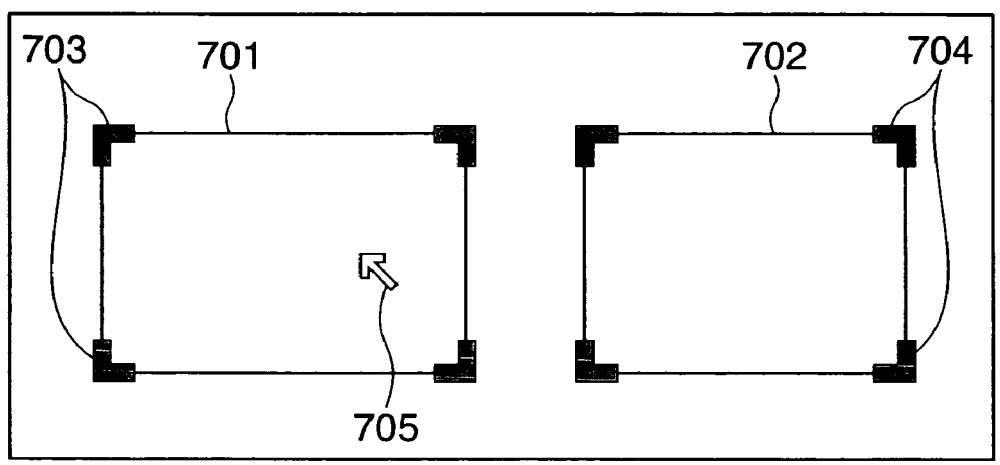
FIGS. 7A to 7C are diagrams showing an example of a UI for link setting.
Figure 7B:
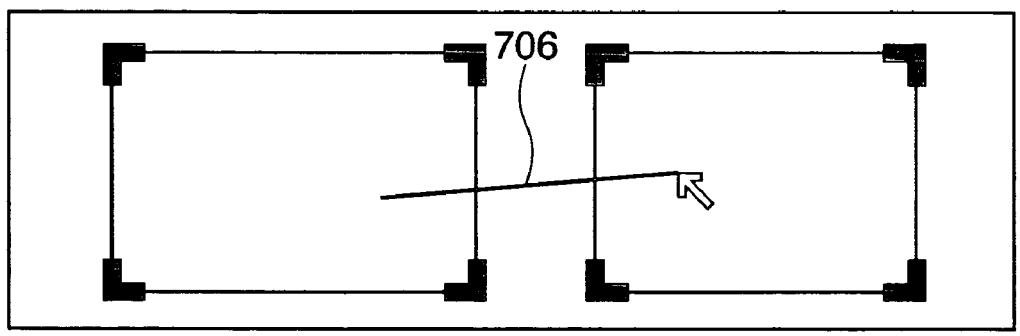
Figure 7C:
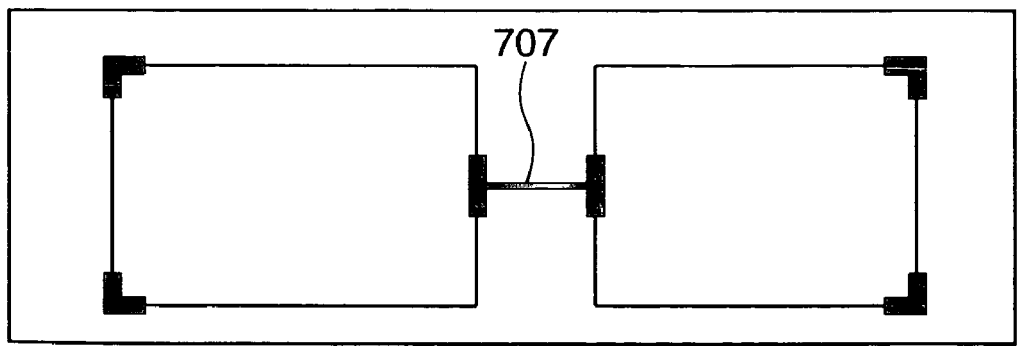

Next, description will be given of a method for setting a link used to associate objects with each other. FIGS. 7A to 7C are diagrams showing an example of a UI used for link setting. With reference to FIGS. 6 and 7A to 7C, description will be given of a method for setting a link to an object.

First, to set a link, (at least two) objects are created which are required to set the link (step S601). FIG. 7A shows two objects (701 and 702) created. Reference numerals 703 and 704 denote anchors and reference numeral 705 denotes a mouse pointer.

In step S602, the link tool button 406 is selected. In step S603, one (in this case, the object 701) of the objects for which a link is to be set is clicked and selected using the mouse pointer 705.

In step S604, the object 702 is selected, for which the link with the object 701, selected in step S603, is to be set. Specifically, the mouse pointer 705 is moved and the object 702 is clicked. FIG. 7B is a diagram showing the state after the object 701 is clicked and before the object 702 is clicked. As shown in this figure, a line 706 is displayed which joins the position clicked in step S603 and the current position of the mouse pointer 705.

In step S604, when the object 702 is selected, a link is displayed between the objects 701 and 702 in step S603. FIG. 7C shows that a link 707 has been displayed by clicking the object 702.

3-8 Setting Link of Flexible Length

Figure 28:
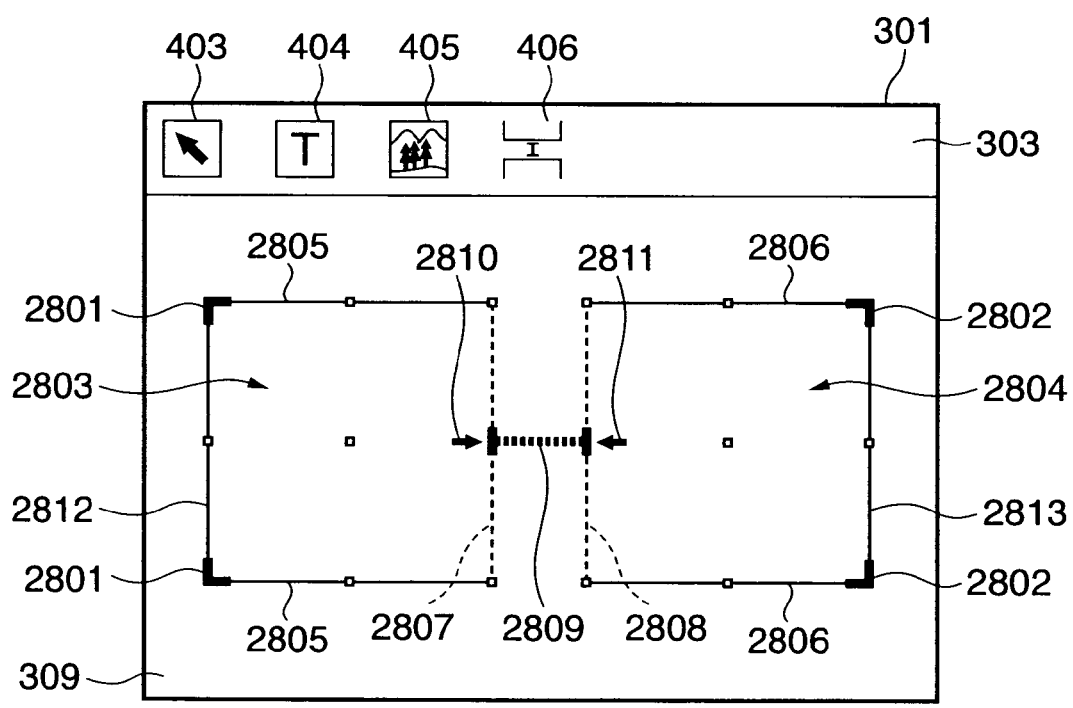
FIG. 28 is a diagram showing an example of a display in a user interface provided when a flexible link is used to arrange containers.

FIG. 28 shows a UI used to set a flexible link. In FIG. 28, containers 2803 and 2804 are present on the document template 309. Each of the containers includes anchor icons 2801 and 2802 and fixed sides 2805 and 2806. A link 2809 of a flexible size is provided between the containers 2803 and 2804 to join the containers 2803 and 2804 together. Since the link is set between the containers 2803 and 2804, a right-hand side 2807 of the container 2803 and a left-hand side 2808 of the container 2804 are expressed by dotted lines. Thus, indicators 2810 and 2811 are displayed for the containers to indicate that the sides 2807 and 2808 are flexible.

Figure 29:
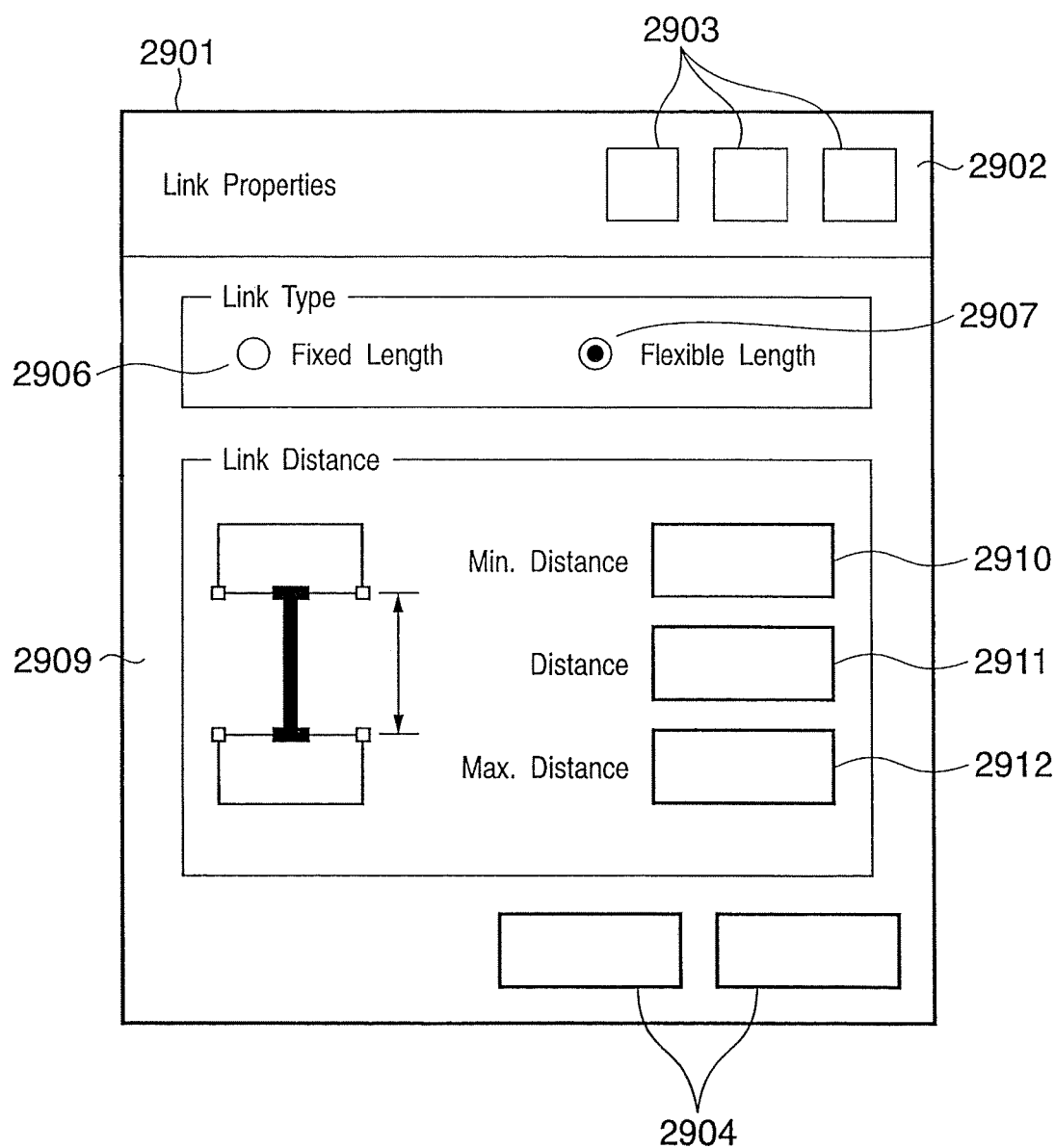
FIG. 29 is a diagram showing a link setting dialog window according to an embodiment.

FIG. 29 shows a UI screen for the link setting means, specifically, an example of a dialog window 2901 used to set information on the link 2809. The dialog window is composed of a title bar 2902, tool buttons 2903, buttons 2904 used to open and close the dialog window, and an area 2909 in which various pieces of information are set. The dialog window enables the selection as to whether the link is of a flexible length (2907) type or fixed length (2906) type. If the link type is flexible, it is possible to set the minimum value (Min. Distance 2910), maximum value (Max. Distance 2912), and reference value (Distance 2911) of the link length. After the link is set between the two containers, this setting is displayed when the set link is selected by an operation such as clicking. Alternatively, the dialog window 2901 for the link may be automatically displayed immediately after the link is set. Here, the reference value 2911 for the distance between the containers is the link length used if the sizes of the containers remain unchanged when data is poured.

Figure 30:
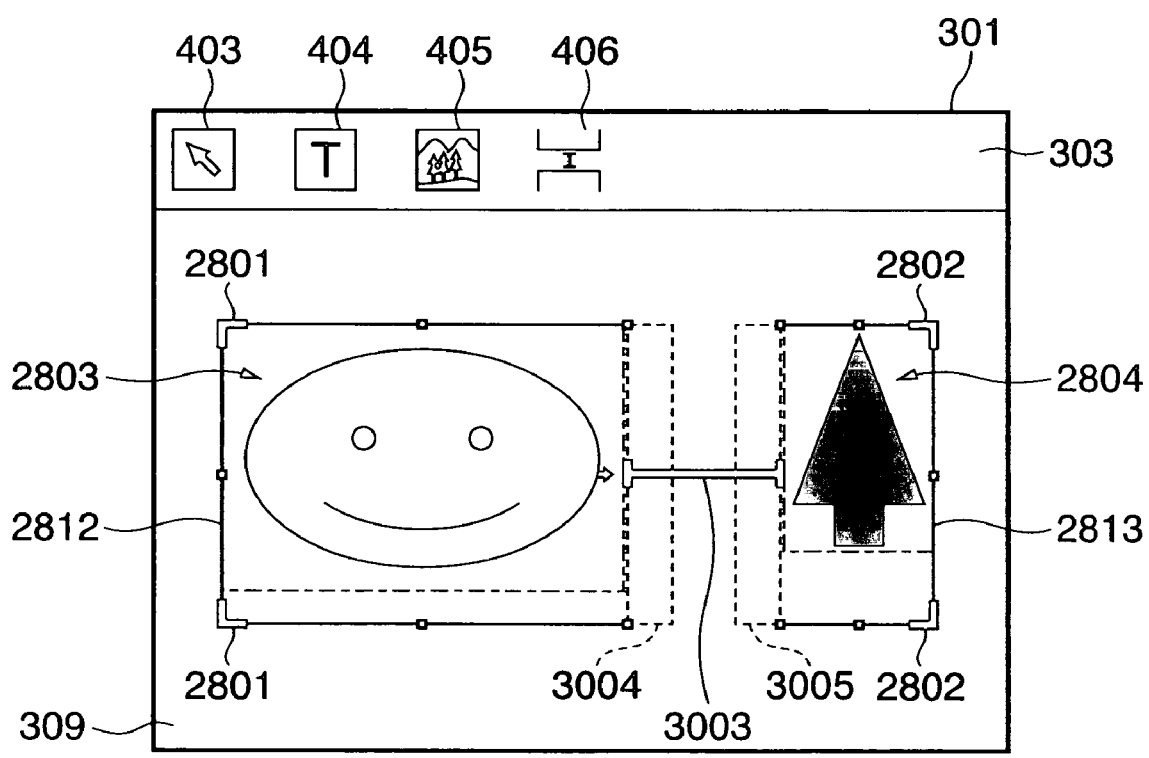
FIG. 30 is a diagram showing an example of the result of layout using a fixed link.

FIG. 30 shows the result of layout if a link of a fixed size is used. The method for layout calculation is as described above. For example, in FIG. 28, it is assumed that image data of different sizes are inserted into the containers 2803 and 2804. Each container considers the data size to be optimum. The container 2803 attempts to change its size rightward so as to reach a frame 3004 (optimum container size) corresponding to the inserted image size. Likewise, The container 2804 attempts to change its size leftward so as to reach a frame 3005 (optimum container size) corresponding to the inserted image size. However, the container 2803 cannot move its left-hand side 2812 owing to the anchor 2801, whereas the container 2804 cannot move its right-hand side 2813 owing to the anchor 2802. Accordingly, the spacing between the two containers must be reduced in order to change the size as described above. However, a link 3003 of a fixed size has been set between the containers. This length is maintained during layout calculation, so that the sizes of the containers 2803 and 2804 are changed.

As a result, the containers 2803 and 2804 cannot obtain the optimum sizes corresponding to the aspect ratio of the data. Finally, the containers 2803 and 2804 are smaller than their optimum sizes (frames 3004 and 3005) as shown in FIG. 30. That is, the fixed size of the link 3003 precludes the containers 2803 and 2804 from achieving the optimum sizes (in FIG. 30, the aspect ratio of the data corresponds to the range shown by an alternate long and short dash line in each container).

Figure 31:
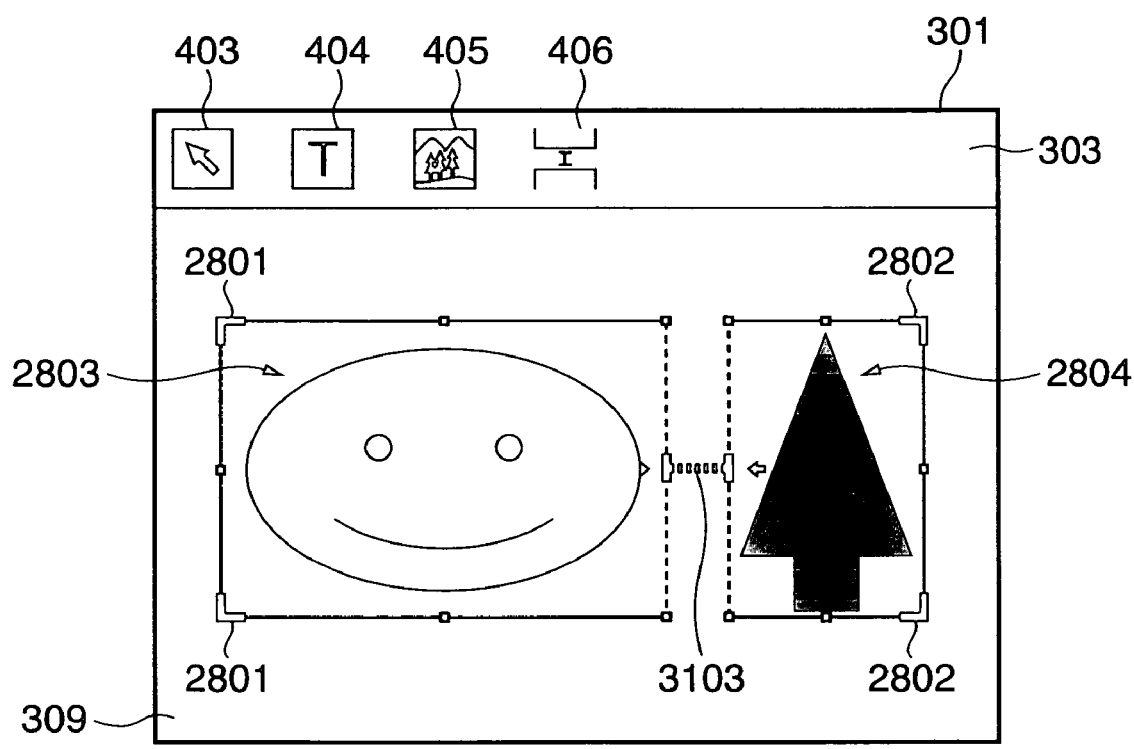
FIG. 31 is a diagram showing an example of the result of layout using a flexible link.

On the other hand, FIG. 31 shows a state similar to that shown in FIG. 30 except that the link has a flexible size. In this case, a link of a flexible size has been set between the containers 2803 and 2804 in the above example. Accordingly, when the sizes of the containers 2803 and 2804 are changed, the link size decreases to enable an increase in the sizes of the containers 2803 and 2804 compared to those in the example in FIG. 30. As a result, it is possible to achieve the optimum size corresponding to the inserted data size or to set a container frame of a size close to the inserted data size (optimum size). FIG. 31 shows this result. The flexible link 2809 has such a size as shown by a flexible link 3103, as a result of layout calculation. In this case, the containers 2803 and 2804 have the optimum sizes (compatible with the data sizes).

4. Description of Automatic Link Function

Next, description will be given of an automatic link function that is characteristic of the layout editing application 121, provided in the host computer 101 according to the present embodiment. The host computer 101 according to the present embodiment comprises not only a function for allowing the user to manually set a link between objects (3 to 6, described above) but also a function for automatically setting a link. For the automatic link function, a file or display menu in the menu bar is used to cause a UI for the automatic link function to be displayed. Then, settings are made such that automatic linking is to be executed. If the automatic link function is used, the details of the link can be set. This will be described in FIG. 8 in detail. The details of the automatic link function will be described below.

Figure 5:
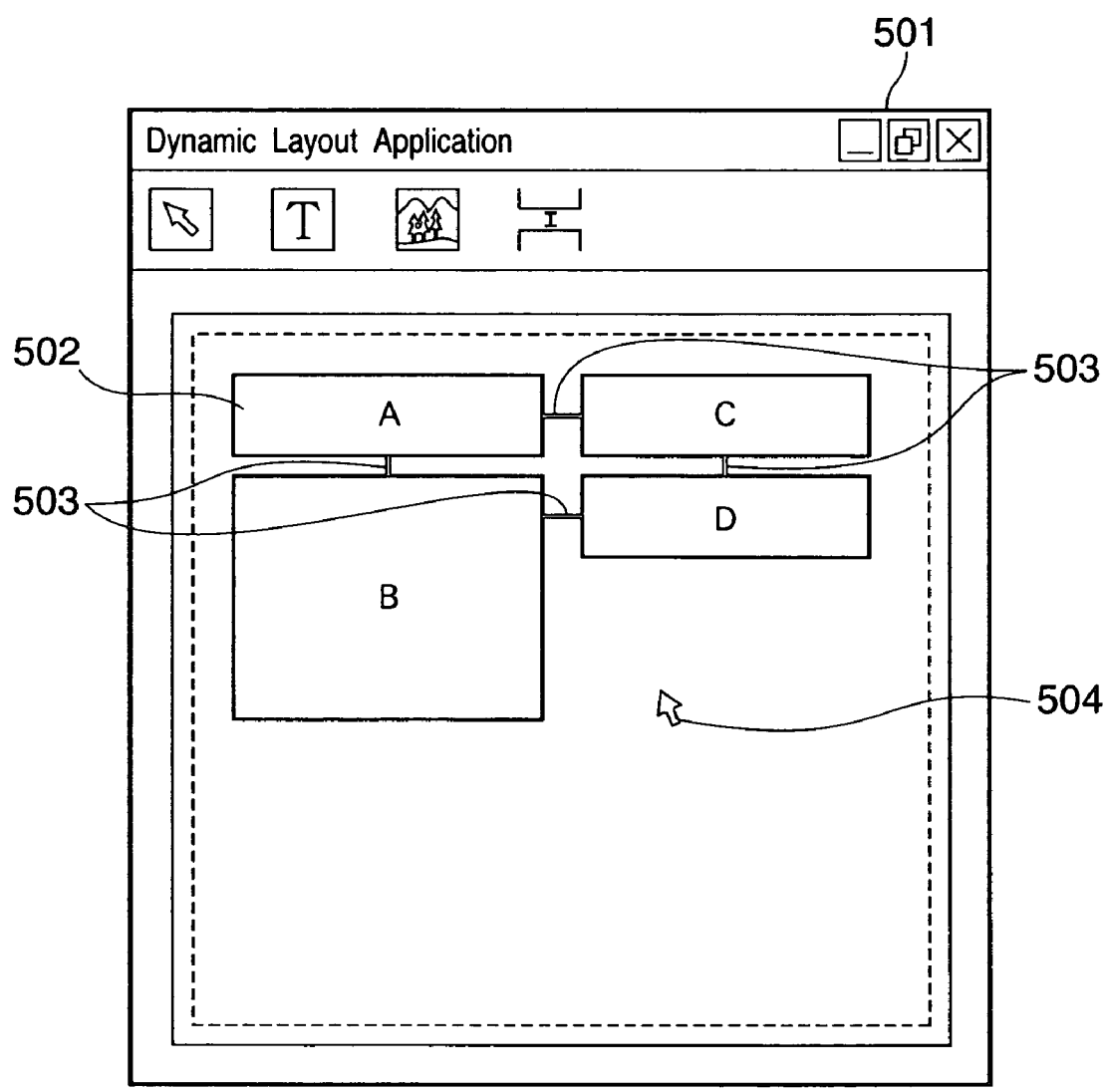
FIG. 5 is a diagram showing an example of a user interface displayed if a layout editing process is executed using a layout editing application comprising an automatic link function.
Figure 6:
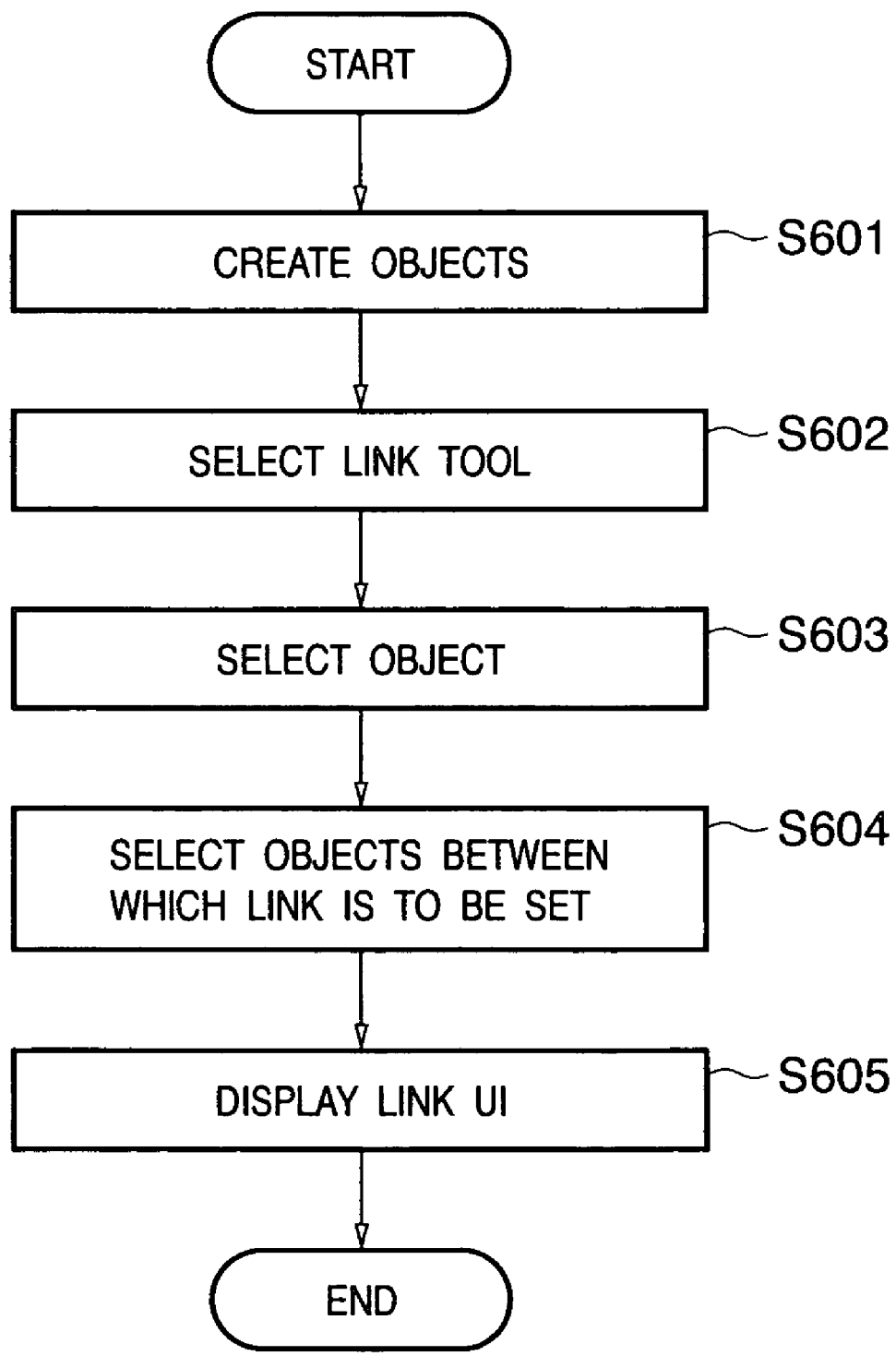
FIG. 6 is a flowchart showing the flow of a link setting process.

4-1 Window Used to Execute Layout Editing Process with Automatic Link Function FIG. 5 is a diagram showing an example of a user interface displayed when a layout editing process is executed using the layout editing application 121, comprising the automatic link function. In FIG. 5, reference numerals 501 and 502 denote an application window and an object, respectively. Reference numerals 503 and 504 denote a link set between the corresponding objects, and a mouse pointer, respectively.

The present specification describes the position of the object. For the position of the object, the upper left corner of a document is used as an origin, a horizontal direction is defined as an X direction, and a vertical direction is defined as a Y direction. When the automatic link function is executed, it is a precondition that the objects are flexible. If the objects are fixed by, for example, setting anchors, the automatic link function does not operate.

4-2 Setting Window

Figure 8:
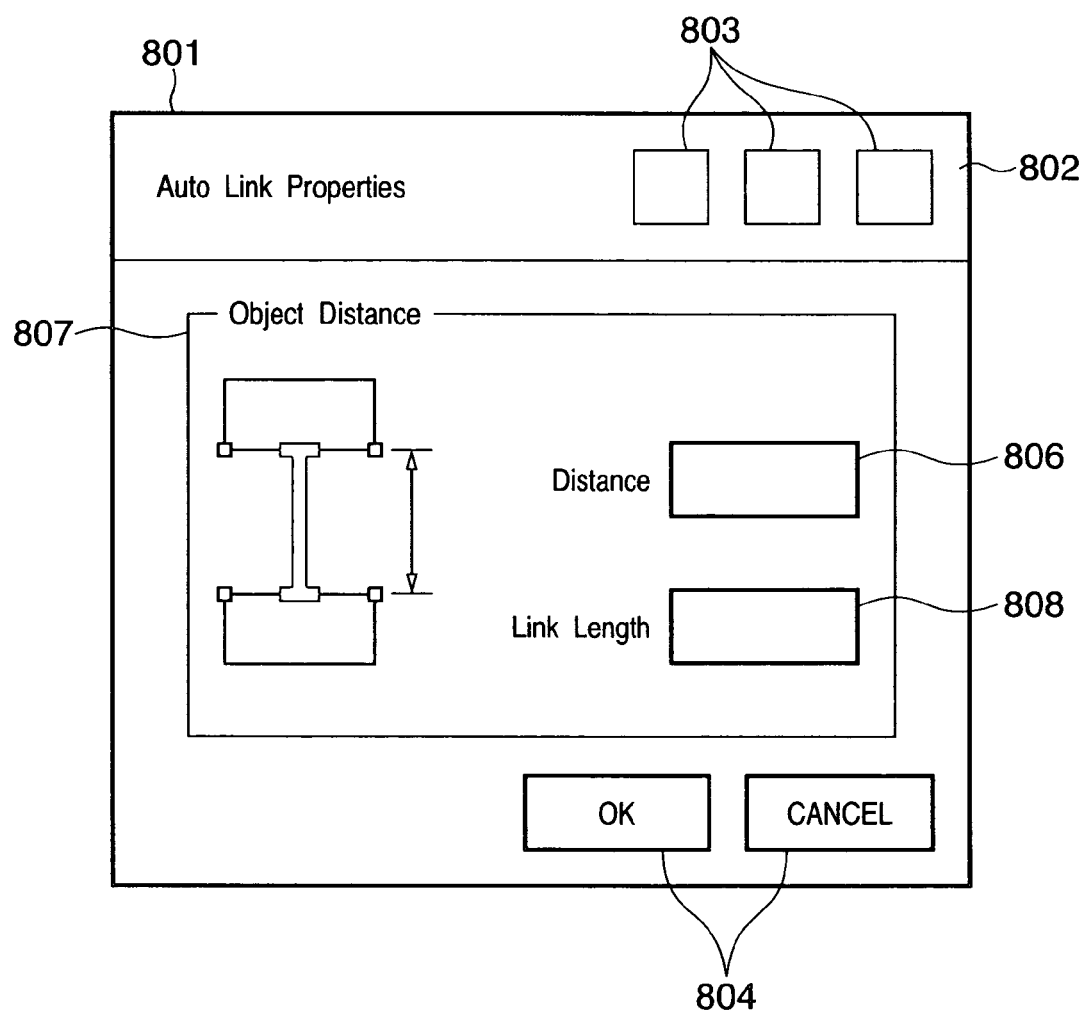
FIG. 8 is a diagram showing an example of a dialog window used to set the distance between objects in operating the automatic link function.

FIG. 8 is a diagram showing an example of a dialog window 801 used to set the distance between objects. As shown in FIG. 8, the dialog window 801 comprises a title bar 802, tool buttons 803, buttons 804 used to open and close the dialog window, and a setting section 807 in which information on the distance between the objects is set.

The user sets, in the dialog window 801, the distance 806 between objects between which a link is to be automatically set (806 will be referred to as a "setting distance" below). It is also possible to set Link Length 808 that is the length of the link to be automatically created. If Link Length 808 is not specified, the length of the set link is the distance between the objects. When the setting is applied by depressing an OK button of the dialog window opening and closing buttons 804, the setting information in the dialog window 801 is stored in the memory 136. The link set in FIG. 8 is assumed to be of the fixed type. However, it is possible to select the link type between the fixed and flexible links. If the setting of a flexible link is selected, a flexible link setting UI in FIG. 29 is displayed.

4-3 Operation of Automatic Link Function if New Object is Created

Figure 11:
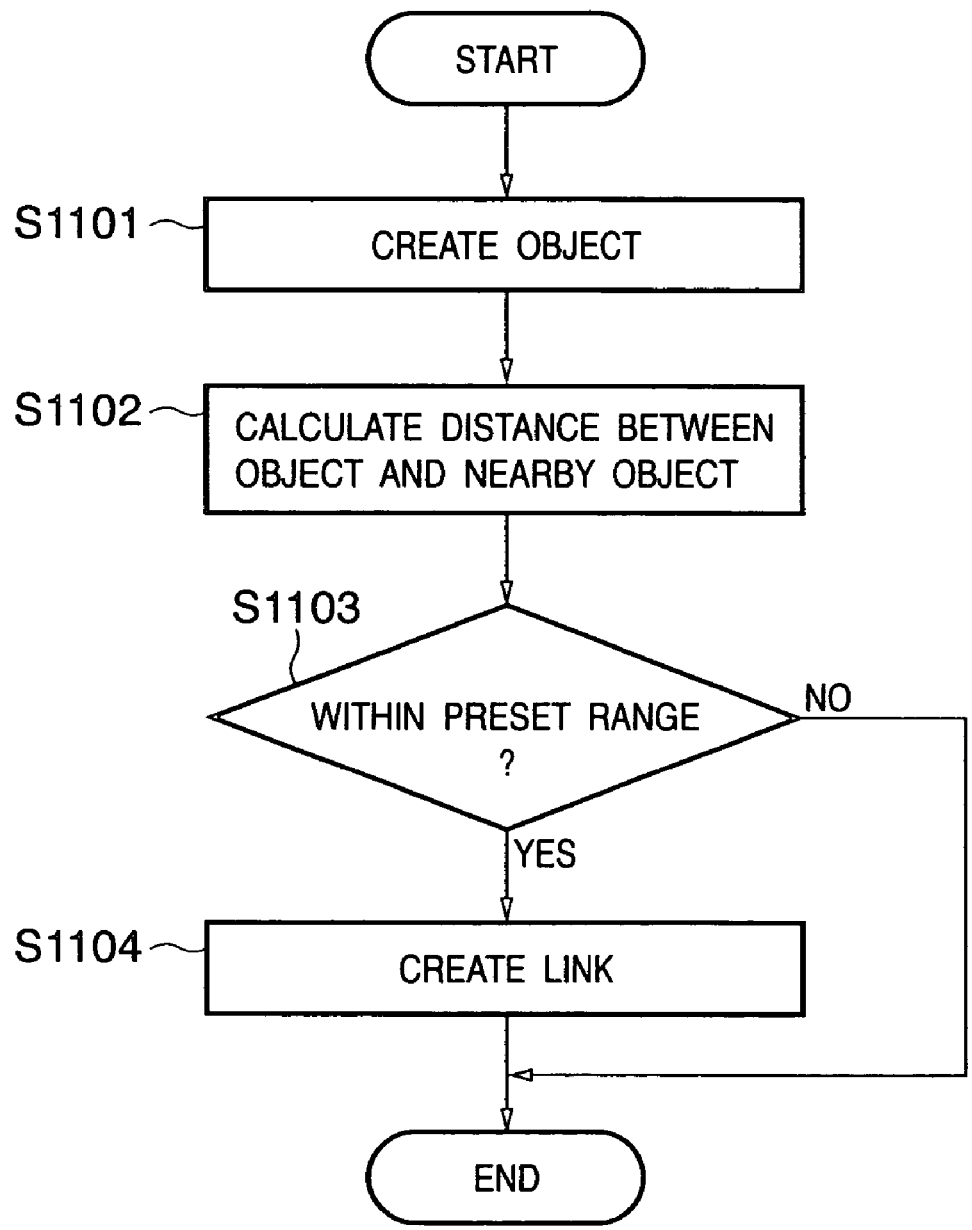
FIG. 11 is a flowchart showing the flow of a general process of the automatic link function executed if a new object is created.

FIG. 11 is a flowchart showing the flow of a general process of the automatic link function executed if a new object is created. The process shown in FIG. 11 is executed under the control of the processor 135 in the host computer 101.

In step S1101, the user creates a new object using the text object tool 404 or the image object tool 405. Then, the layout editing application 121 stores positional information on the created object in the memory 136.

In step S1102, the layout editing application 121 calculates the distance between the object created and a nearby object. In the present specification, the distance between objects refers to the distance between sides of the target objects which are the closest to each other. If a plurality of objects are present near the object created, the distance between the object created and each of the nearby objects is determined.

In step S1103, the layout editing application 121 compares the distance obtained and a preset distance 806. If the distance obtained is equal to or shorter than the set distance, a link is created between the objects (step S1104). The process is thus finished. On the other hand, if the distance obtained is larger than the set distance, the process is finished without creating any link. The details of the link creating process will be described below.

4-4 Operation of Automatic Link Function if Object is Moved

Figure 12:
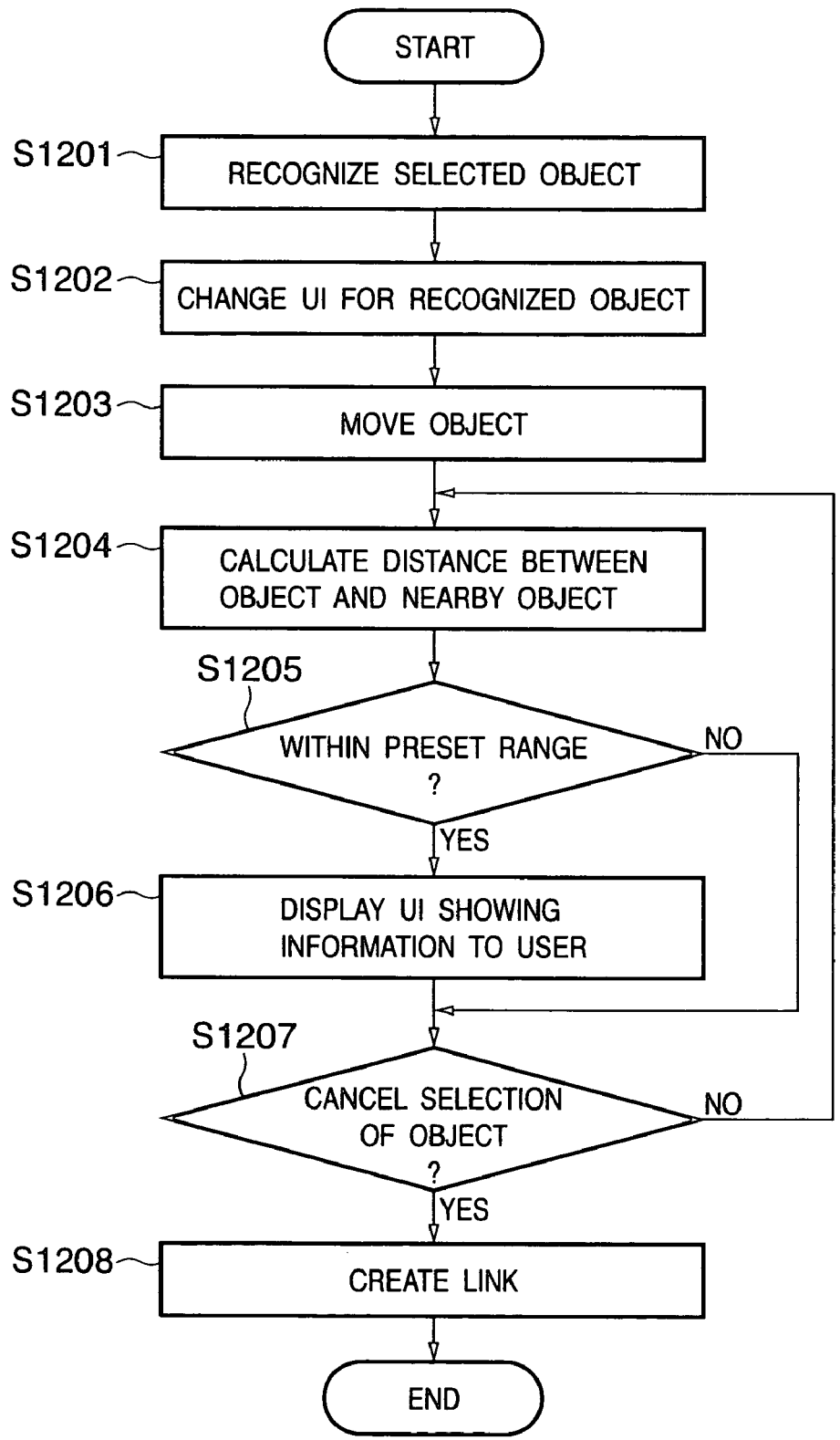
FIG. 12 is a flowchart showing the flow of a general process of the automatic link function executed if an object is moved.

FIG. 12 is a flowchart showing the flow of a general process of the automatic link function executed if any of the laid-out objects are moved. The process shown in FIG. 12 is executed under the control of the processor 135 in the host computer 101.

In step S1201, the user selects an object to be moved. Then, the layout editing application 121 recognizes the object selected by the user.

Figure 9:
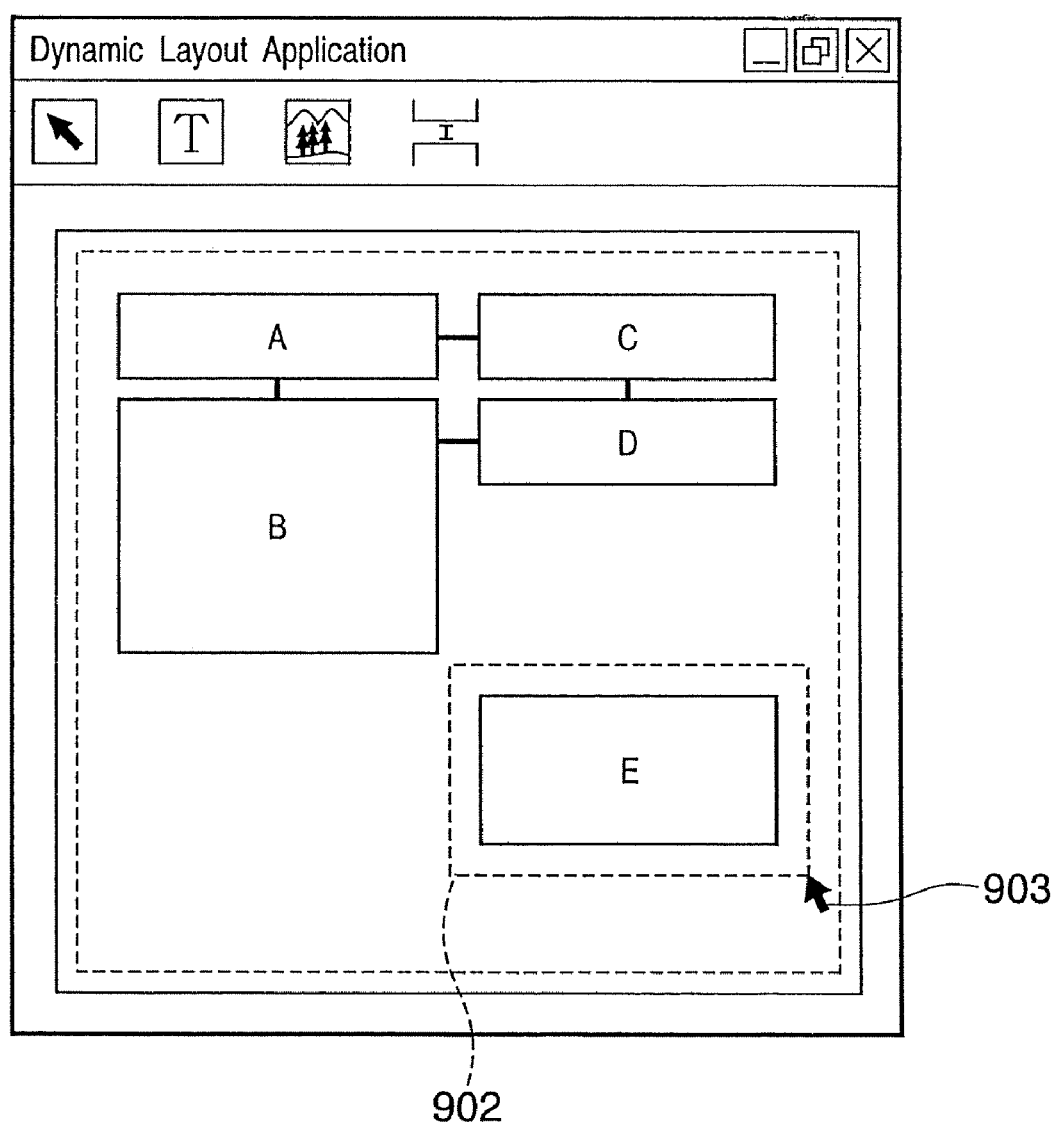
FIG. 9 is a diagram showing an example of a UI for object selection.
Figure 10:
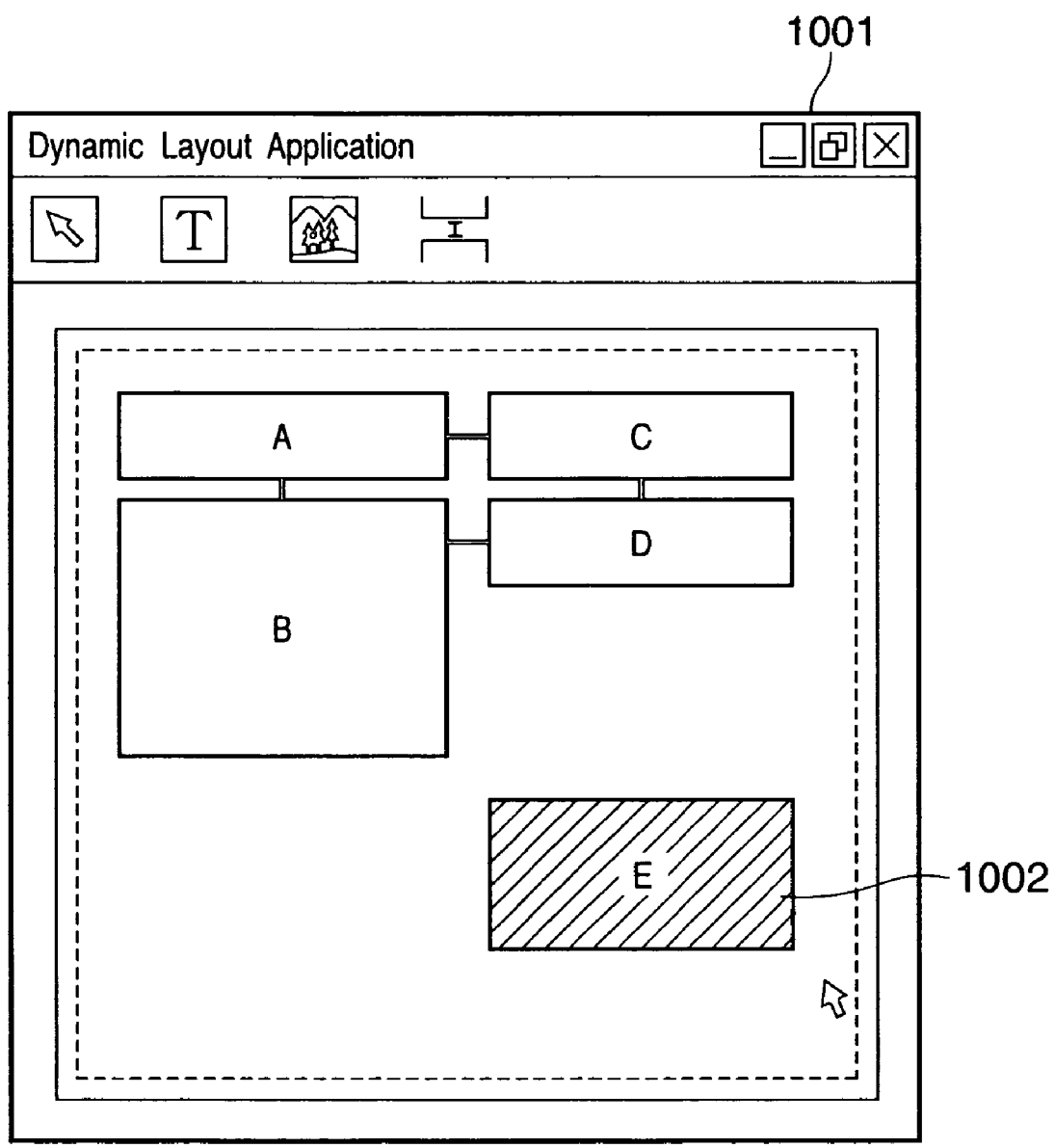
FIG. 10 is a diagram showing an example of a UI change made to a selected object.

In step S1202, the UI is changed so that the user can view the recognized object. FIG. 9 shows that an object E has been selected. The object can be selected by using a mouse pointer 903 to drag a rectangle 902 so that the object lies inside the rectangle. Alternatively, the object can be selected by using the mouse pointer 903 to depress it. The method for selection is not limited to this but another method may be used. FIG. 10 shows an example in which the display of the object E has been changed in order to clearly show the user the selection of the object E (1002). In this example, the object is shaded. However, another method may be used to show the selection.

Figure 13:
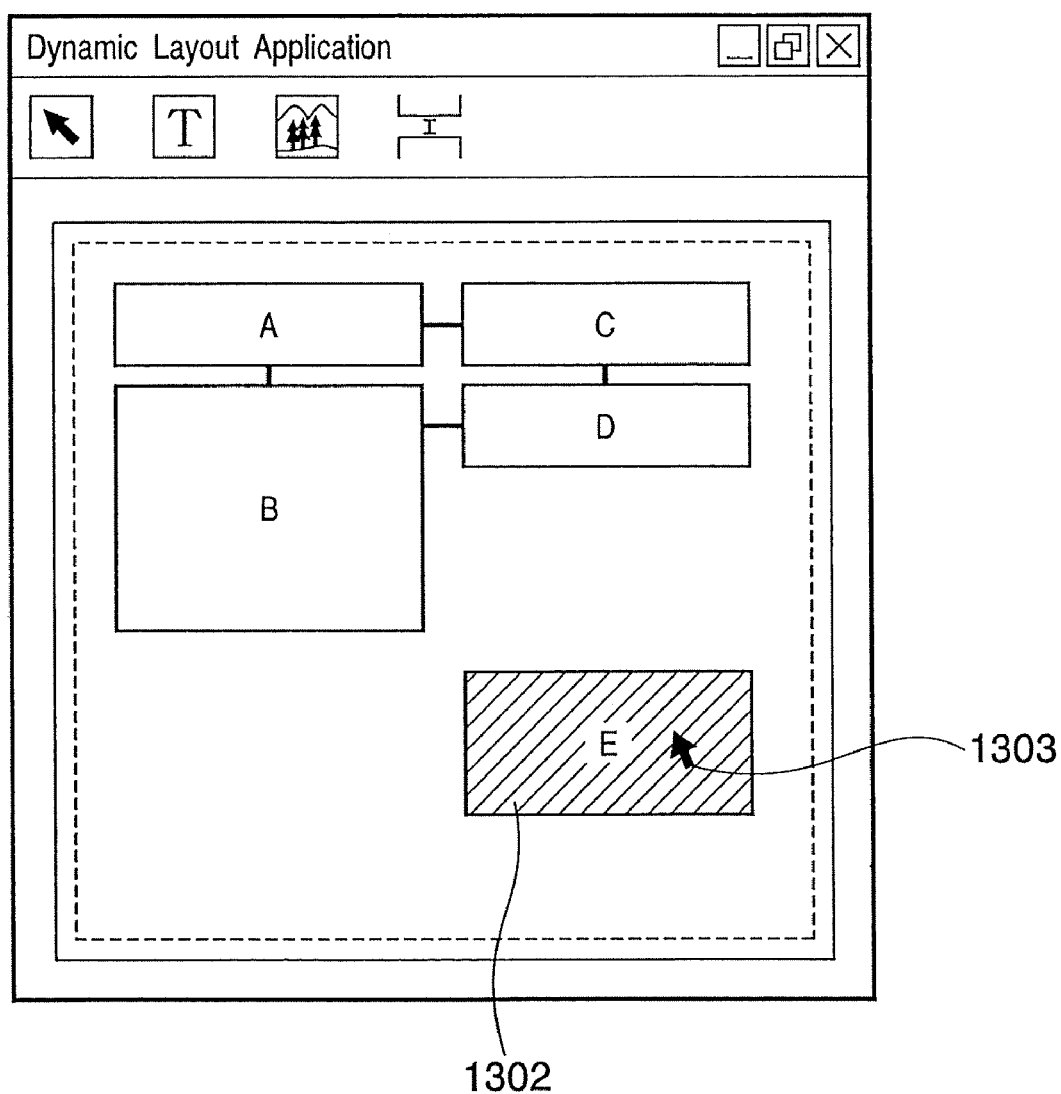
FIG. 13 is a diagram showing how a selected object is moved by using a mouse pointer to drag it.

In step S1203, the user uses the mouse 133 to drag and move the selected object to a desired position. Then, the layout engine 105 acquires the positional information on the object at the destination. FIG. 13 shows that the object E is being moved by using the mouse pointer 1303 to drag it (1302).

In this case, when the moved object is still being dragged by the mouse 133, the application 121 calculates the distance between the moved object and a nearby object, as in the case where a new object is created, (step S1204). If a plurality of objects are present near the moved object, the application 121 determines the distance between the moved object and each of the nearby objects.

Figure 14:
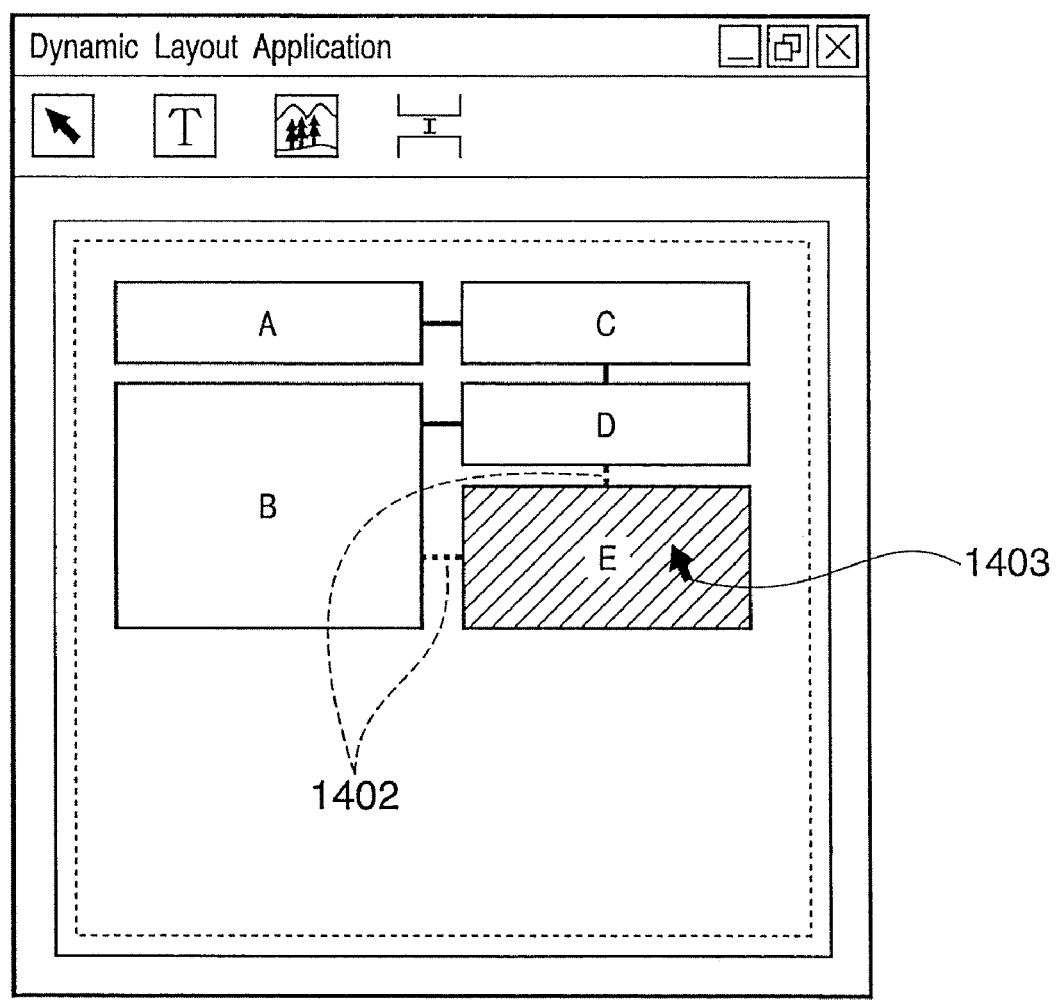
FIG. 14 is a diagram showing an example of a UI that indicates to a user that the moved object has at most a set distance.

In step S1205, the layout editing application 121 compares the distance obtained with the set distance 806. If the distance obtained is equal to or shorter than the set distance, the process advances to step S1206 to display a UI that visually indicates this to the user. FIG. 14 shows an example of a UI that shows the user that the distance to the moved object is equal to or shorter than the set distance (1402). In this example, the link is shown as a dotted line. However, another method may be used to show the link.

Figure 19:
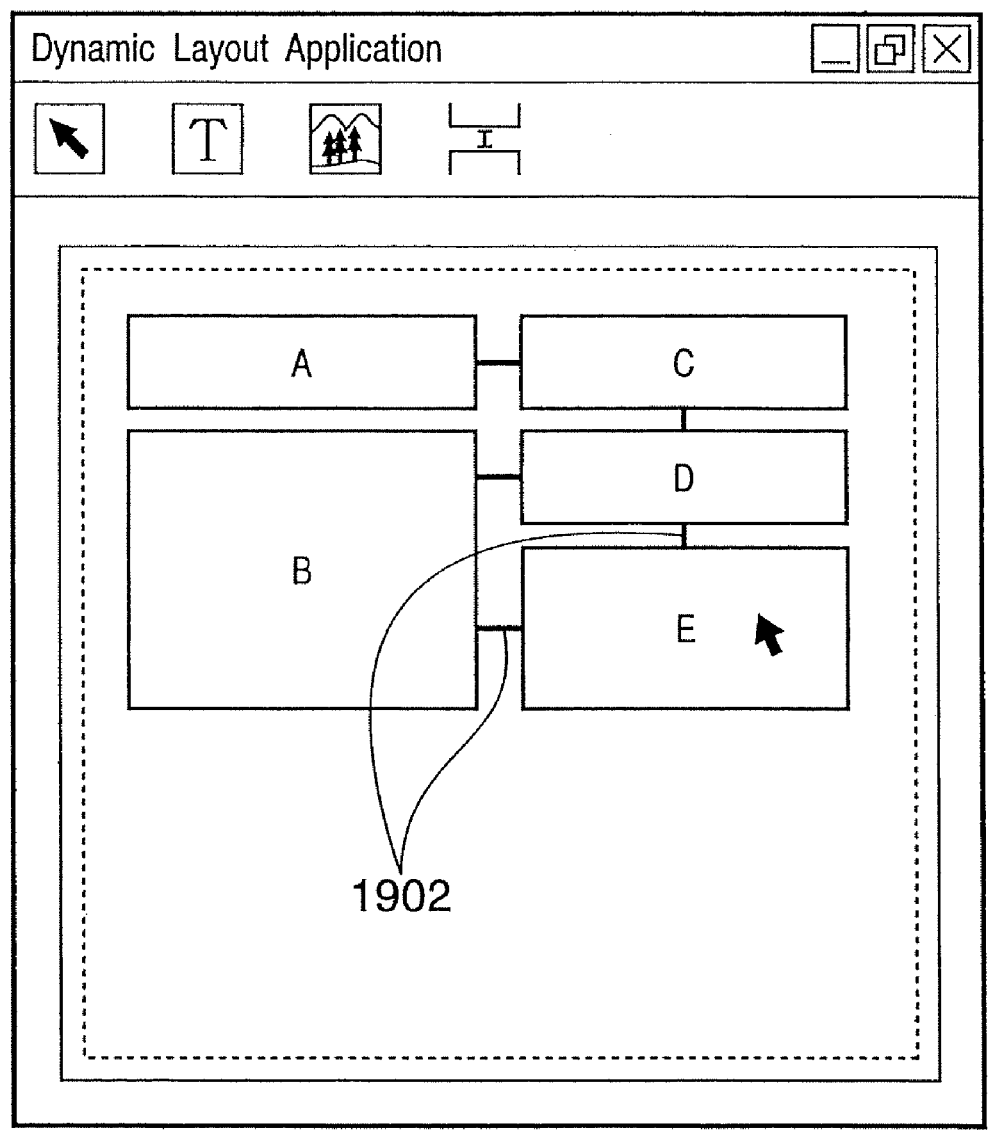
FIG. 19 is a diagram showing that links have been created between objects.

In step S1207, when the user drops the mouse 133 with the UI displayed, the layout editing application 121 recognizes that the object has been unselected. In step S1208, the layout editing application 121 creates, according to the processing in step S1207, a link between the objects determined to be within the range preset in step S1205 as described in FIG. 12. FIG. 19 shows that in the state shown in FIG. 14, the mouse is dropped to change the link UI to an ordinary display 1902 to indicate that the link has been created between the objects. On this occasion, the positional information on the selected object on the memory 136 is updated to the moved position.

On the other hand, when the mouse 133 is further moved without being dropped, the layout editing application 121 calculates the distance between the moved object and a nearby object again (that is, the determination in step S1207 is "No" and the process returns to step S1204).

4-5 Link Creating Process (In Case where New Object is Created)

FIG. 15 is a flowchart showing the details of a link creating process (step S1104) executed when a new object is created. The process shown in FIG. 15 is executed under the control of the processor 135 in the host computer 101.

In step S1501, the layout engine 105 first acquires the positional information on the newly created object. As previously described, in the present application, the distance between objects refers to the distance between the sides of the objects. Accordingly, the "positional information acquired" is positional information on each side of the object in the X and Y directions.

In step S1502, the layout editing application 121 checks whether or not any objects different from the above one have been laid out. If any objects different from the above one have been laid out, the layout editing application 121 acquires information on the number and positions of the objects. The object positional information acquired is stored in a sequence.

In step S1503, the layout editing application 121 executes a link setting process. When the link setting process is finished and if no other objects have been laid out, the process is finished.

4-6 Link Creating Process (In Case where New Object is Created)

Figure 16B:
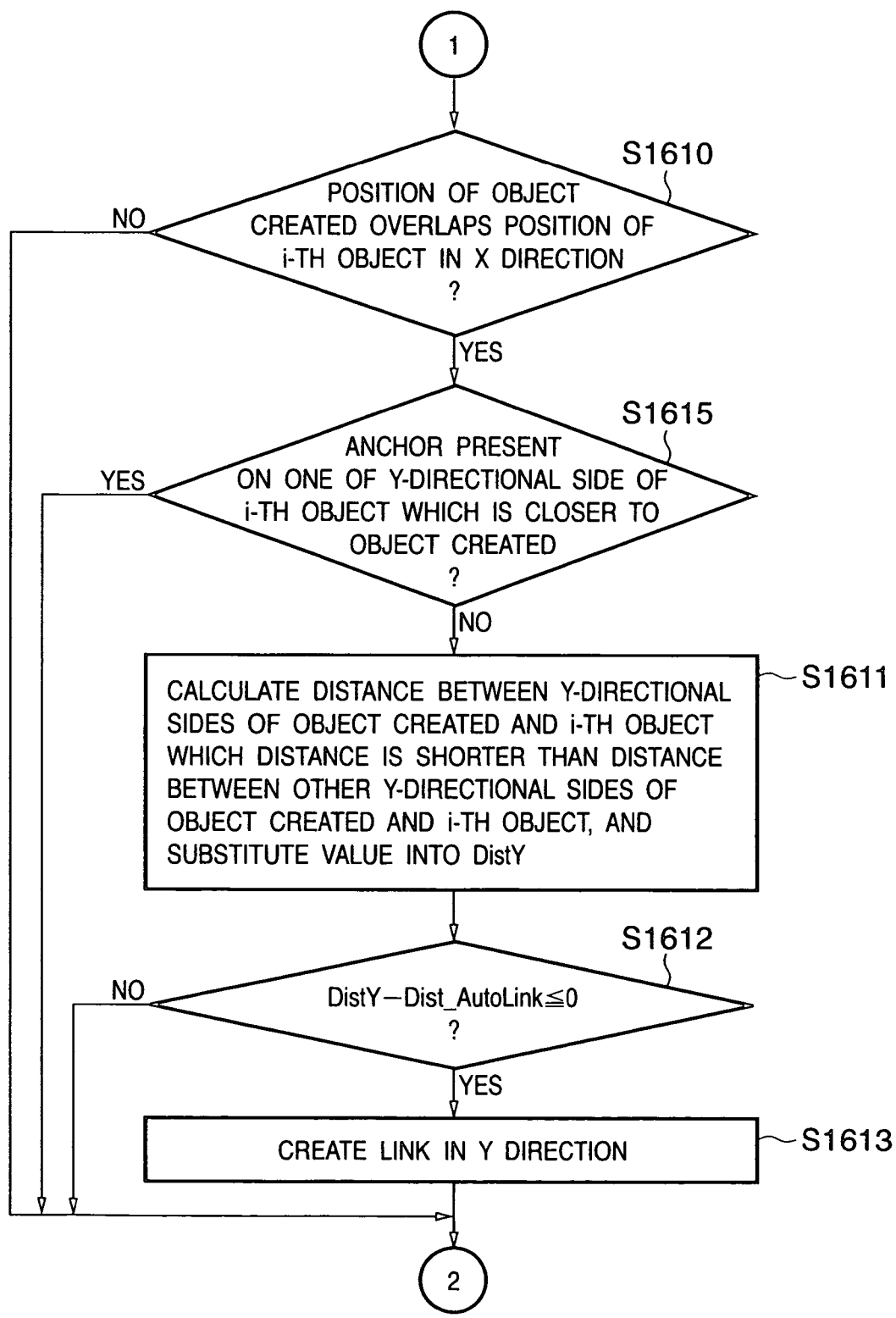
FIG. 16B is a flowchart showing the detailed flow of the link setting process.

FIGS. 16A and 16B are flowcharts showing the detailed flow of the link creating process (step S1503) shown in FIG. 15. The process shown in FIGS. 16A and 16B is executed under the control of the processor 135 in the host computer 101. A link is set by extracting a nearby object and setting a link to this object. If the distance between the objects is equal to or shorter than the set distance, a link is set between the objects. If a plurality of objects are found for which the inter-object distances are equal to or shorter than the set distance, links are set for the plurality of containers for which the inter-object distances are equal to or shorter than the set distance.

In step S1601, the layout editing application 121 substitutes Dist_AutoLink for the distance 806 between objects between which a link is to be automatically created. The layout editing application 121 then substitutes 1 into i.

Figure 18:
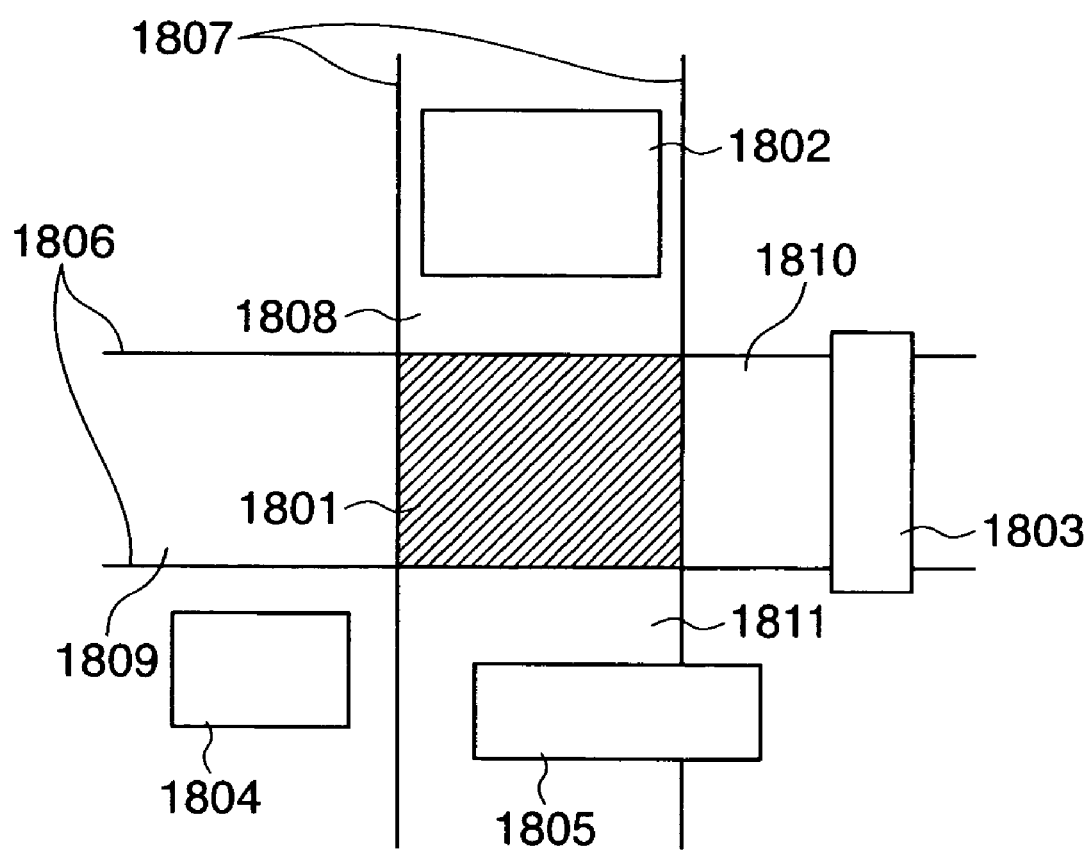
FIG. 18 is a diagram showing a region to be subjected to link creation.

In step S1602, the application checks whether or not the position of the object created overlaps the position of the i-th object in the Y direction. It is a precondition for the automatic link function according to the present embodiment that the objects between which a link is to be created are located in the same horizontal or vertical direction. FIG. 18 shows a region for which a link is to be created. A link will be created if a part or the whole of an object is present in a region 1808 or 1811 enclosed by an X-directional side of an object created 1801 and extensions 1807 of Y-directional sides of the object 1801 or a region 1809 or 1810 enclosed by a Y-directional side of the object 1801 and extensions 1806 of X-directional sides of the object 1801. In this case, no link is created between another object and any of the extensions 1807 of the Y-directional sides of the object 1801 or the extensions 1806 of the X-directional sides of the object 1801. In FIG. 18, in the X direction, an object 1803 can be linked to the object 1801. In the Y direction, objects 1802 and 1805 can be linked to the object 1801. No link is created for an object 1804.

If in step S1602, the position of the object created is determined to overlap the position of the i-th object in the Y direction, the process advances to step S1603 to determine whether or not the positions in the Y direction overlap each other. If the position of the object created is not determined to overlap the position of the i-th object in the X direction, the process advances to step S1614.

In step S1614, the application checks whether or not an anchor has been set on one of the X-directional sides of the i-th object which is closer to the object created. If an anchor has been set on this side, the side is fixed, so that no link will be set. If no anchor has been set on this side, the process advances to step S1604 to calculate the distance between X-directional sides of the object created and the i-th object which distance is smaller than that between the other X-directional sides of the object created and the i-th object. The result is substituted into DistX.

In step S1605, the layout editing application 121 compares the DistX calculated in step S1604 with Dist_AutoLink in which the set distance at which an automatic link is to be created. If the DistX is smaller than the Dist_AutoLink, that is, the calculated DistX value is determined to be equal to or smaller than the set distance value, the process advances to step S1606 to create an X-directional link between the objects.

Figure 20:
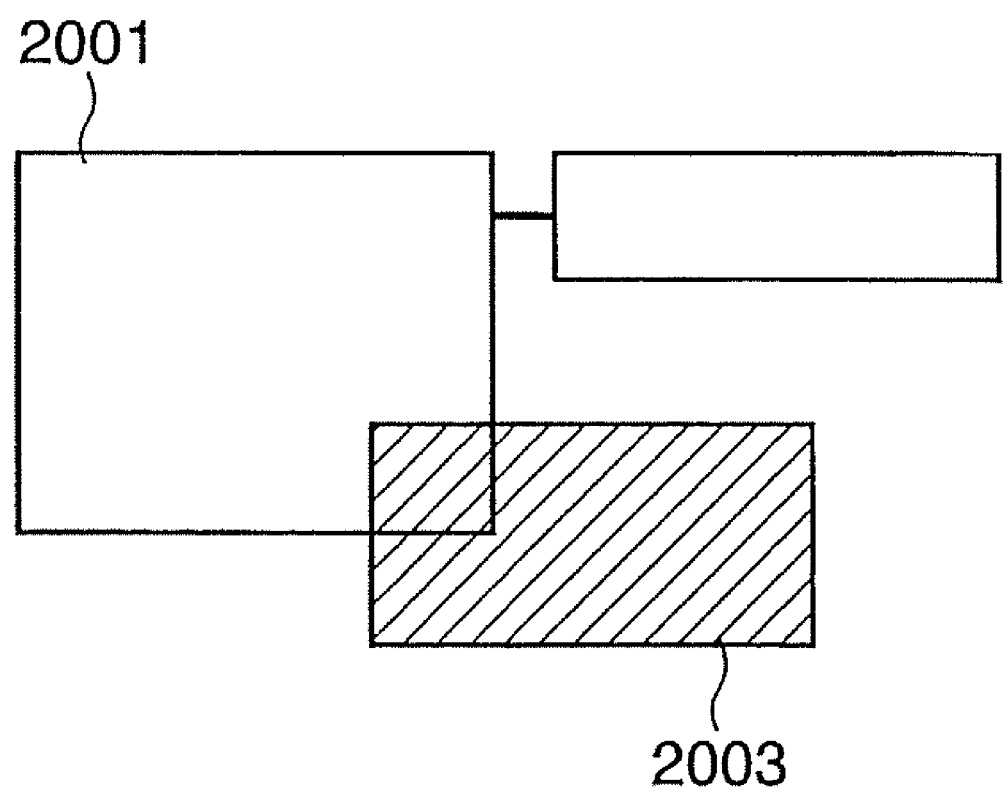
FIG. 20 is a diagram showing an example in which an object has been created at a position where it overlaps another object.

On the other hand, if the positions are determined to overlap in step S1603, this means that the objects overlap. FIG. 20 shows that an object 2003 has been created at a position where it overlaps an object 2001. In this case, the layout editing application 121 checks in step S1607 whether or not to set a link for the user (details will be described below).

After steps S1606 and S1607 are executed or if the application determines in step S1614 that an anchor has been set on a side or in step S1605 that the DistX is larger than the Dist_AutoLink, the process advances to step S1608 to increment i-th in order to check the next nearby object.

Description has been given of the process for creating a link in the X direction. If the application determines in step S1602 that the positions do not overlap, the process advances to step S1610 in FIG. 16B. The layout editing application 121 executes a check for a link in the Y direction to determine whether or not the objects overlap in the X direction.

If the positions are determined to overlap in step S1610, the process advances to step S1615 to check whether or not an anchor has been set one of the Y-directional sides of the i-th object which is closer to the object created. If no anchor has been set on this side, the process advances to step S1611 to calculate the distance between Y-directional sides of the object created and the i-th object which distance is shorter than that between the other Y-directional sides of the object created and the i-th object. The result is substituted into DistY.

Moreover, in step S1612, the application compares the compares the DistY calculated in step S1611 with Dist_AutoLink. If the DistY is smaller than the Dist_AutoLink, that is, the calculated DistY value is determined to be equal to or smaller than the set distance value, the process advances to step S1613 to create a Y-directional link between the objects.

After step S1613 is executed or if the application does not determine in step S1610 that the positions overlap or determines in step S1615 that an anchor has been set on a side or in step S1612 that the DistY is larger than the Dist_AutoLink, the process advances to step S1608, and the layout editing application 121 increments i in order to check the next nearby object.

In step S1609, the application determines whether or not all the arranged objects have been checked. If not all the objects have been checked, the process advances to step S1602 to repeat a reading process. If all the objects have been checked, the link setting process is finished. In this manner, when a new object is created and if the application confirms that another object is present within the predetermined distance set by the user, a link is automatically created. Consequently, an increase in the number of objects does not degrade the efficiency of the user's operations.

4-7 Link Creating Process (In Case where Object is Moved)

Figure 21:
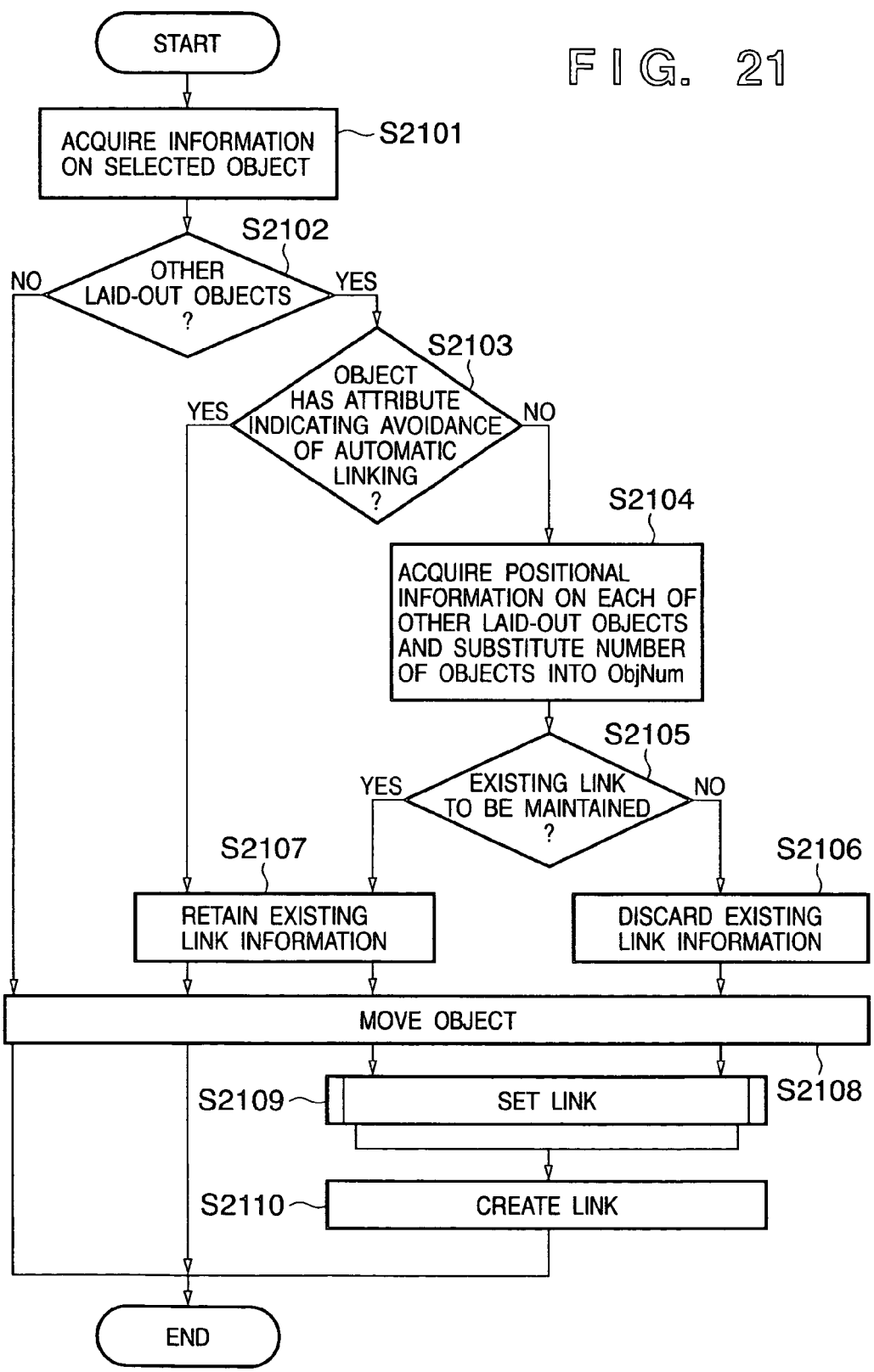
FIG. 21 is a flowchart showing the details of a link creating process executed when an object is moved.

FIG. 21 is a flowchart showing the details of the link creating process (step S1208) executed when any of the objects is moved. The process shown in FIG. 21 is executed under the control of the processor 135 in the host computer 101.

In step S2101, the layout engine 105 acquires the positional information on the selected object. In step S2102, the layout editing application 121 checks whether or not an object is present which is different from the above one. If in step S2102, no other objects are laid out, then in step S2108, the object is moved to finish the process.

On the other hand, if the application determines in step S2102 that another object is present, the process advances to step S2103. The application 121 then checks whether or not the selected object has an attribute indicating the avoidance of automatic linking. The attribute indicating the avoidance of automatic linking disables the automatic link function to prevent a link from being created between objects even if the distance between them is equal to or shorter than the set distance 806.

Figure 27:
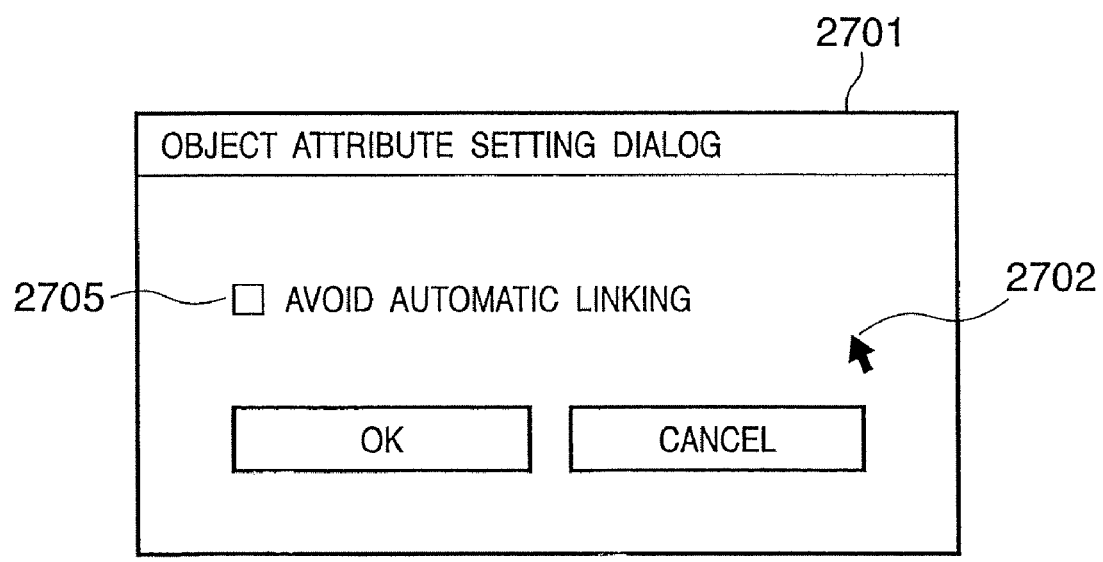
FIG. 27 is a diagram showing a dialog window used to make setting as to whether or not to automatically link objects.

FIG. 27 is a diagram showing a dialog window used to set automatic linking for each object. A property dialog window 2701 is displayed by selecting an object and using the mouse to execute a right click or operating a particular key of the keyboard. For the setting for automatic linking, the automatic link function can be disabled by selecting an attribute 2705 indicating the avoidance of automatic linking. If the object has the attribute indicating the avoidance of automatic linking, it can be arbitrarily moved without the need to create any link with another object. If a link with another object has already been set, even if movement of the object results in an increase in the predetermined distance specified by the user, the object can be moved while retaining the link and without the need to create a further link.

Figure 23:
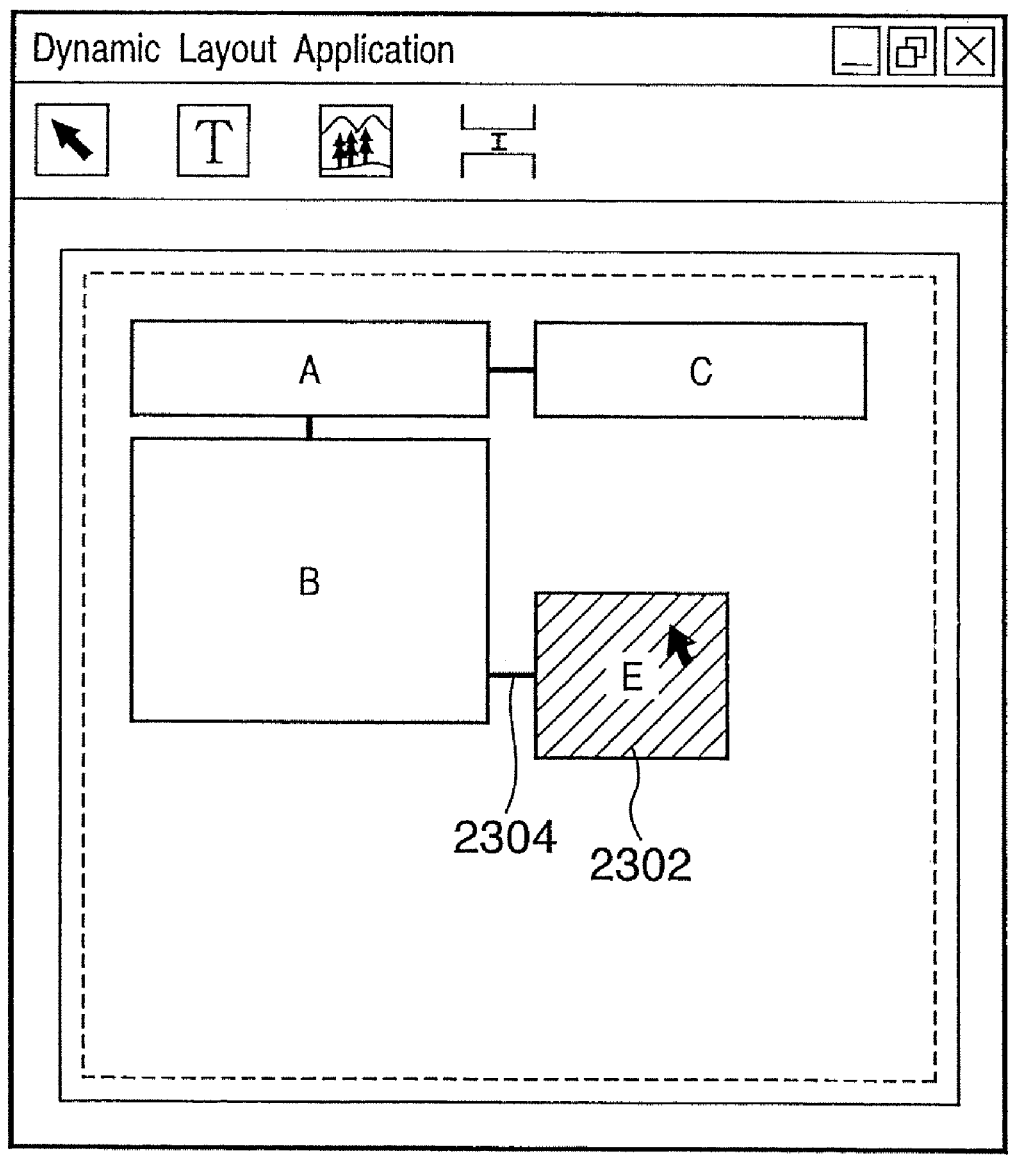
FIG. 23 is a diagram showing that an object having a set link has been selected.
Figure 24:
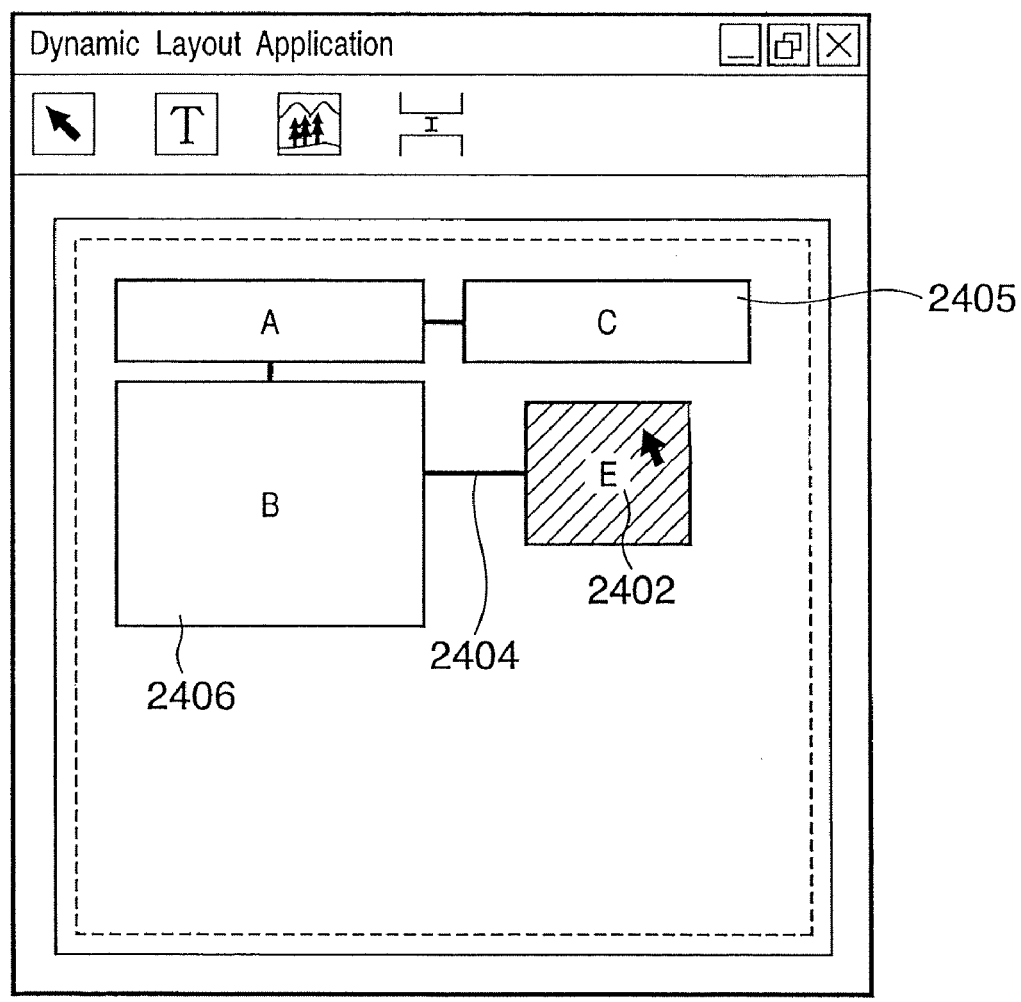
FIG. 24 is a diagram showing an example of the result of movement of an object having an attribute that avoids automatic linkage.

FIG. 23 shows an example in which an object 2302 is selected for which a link 2304 has already been set. If the object 2302 has the attribute indicating the avoidance of automatic linking, even if movement of the object 2302 in FIG. 23 makes the distance between objects 2402 and 2405 equal to or shorter than the set distance 806 as shown in FIG. 24, no link is created between the objects 2404 and 2405. On the other hand, if the distance between objects 2402 and 2406 exceeds the set distance 806, the link 2404 remains set.

FIG. 21 is referred to again. If the object selected in step S2103 does not have the attribute indicating the avoidance of automatic linking, the process advances to step S2104. The layout editing application 121 acquires the number of other laid-out objects and positional information on them. The object positional information acquired is stored in a sequence.

In step S2105, the application determines whether the user has selected the retention or discarding of the already set link as an operation performed when the object is moved. Whether to retain or discard the link may be selected by, for example, moving the object while depressing a particular key on the keyboard 132. However, the present invention is not limited to this method. A different method may be used to select the retention or discarding.

If in step S2105, the application determines that the user has selected the retention of the existing link, then it moves the object while retaining the existing link information (steps S2107 and S2108). The layout editing application 121 creates links only for the objects for which links have not been created yet (step S2109). On the other hand, if the application determines in step S2105 that the user has selected the discarding of the existing link, it discards the information on the existing link and then moves the object (steps S2106 and S2108). The application-then creates links for all the laid-out objects (step S2109).

Figure 25:
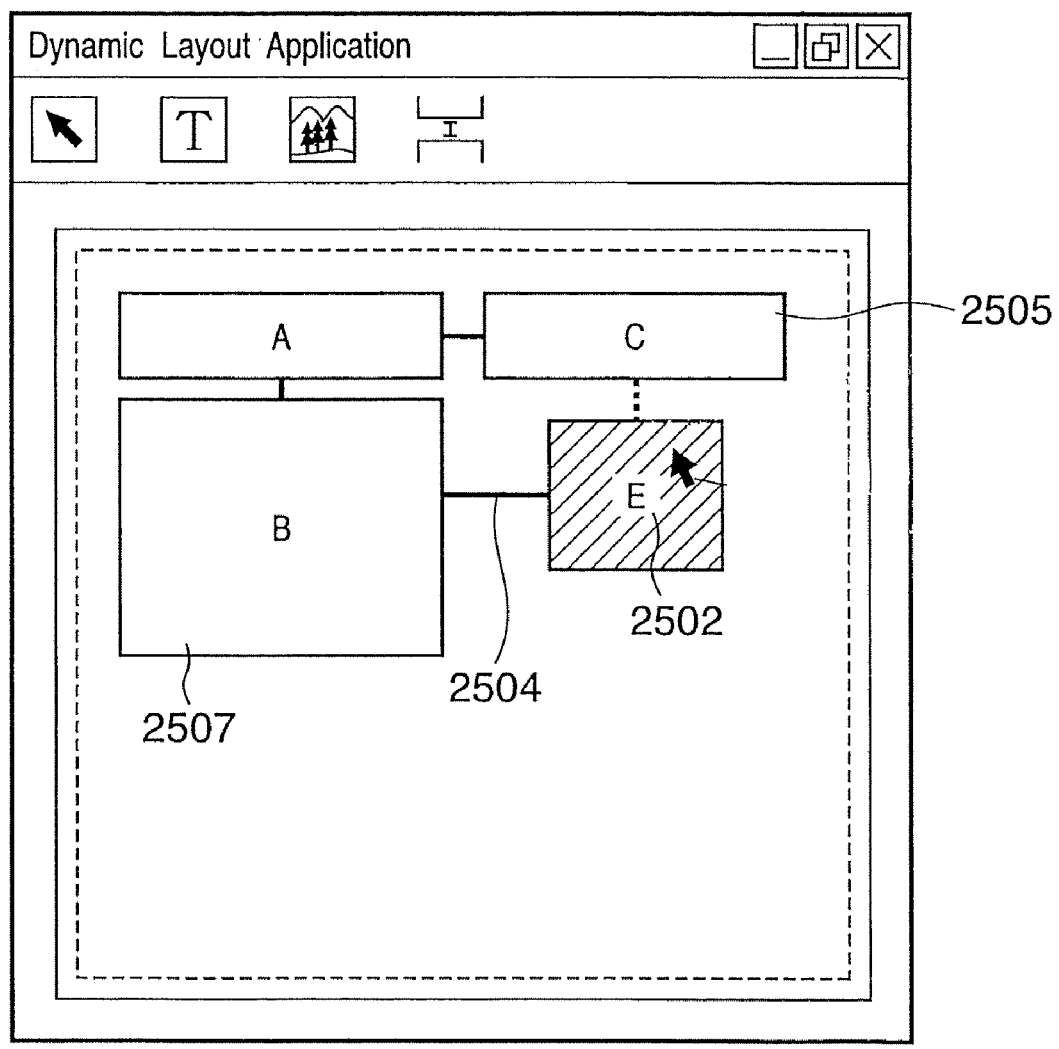
FIG. 25 is a diagram showing an example of the result of object movement executed if existing link holding has been selected.

FIG. 25 shows an example in which when the object 2302 does not have the attribute indicating the avoidance of automatic linking in FIG. 23, the user selects the retention of the existing link and moves an object 2502 so that the distance between objects 2502 and 2505 is equal to or shorter than the set distance 806. Even if the distance between the objects 2502 and 2507 is longer than the set distance 806, a link 2504 remains set.

Figure 26:
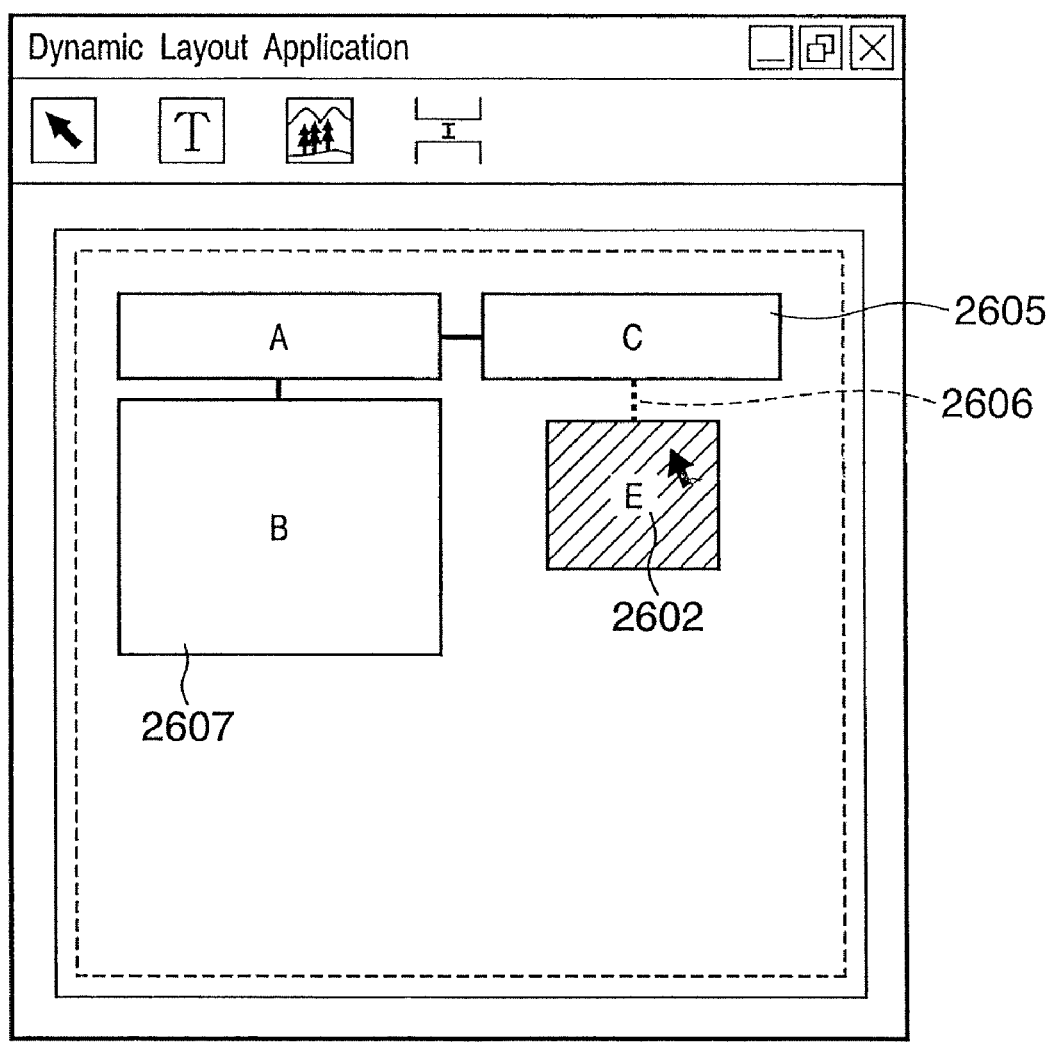
FIG. 26 is a diagram showing an example of the result of object movement executed if existing link discard has been selected.

FIG. 26 shows an example in which when the object 2302 does not have the attribute indicating the avoidance of automatic linking in FIG. 23, the user selects the discarding of the existing link and moves an object 2602 so that the distance between objects 2602 and 2605 is equal to or shorter than the set distance 806. Even if the distance between the objects 2602 and 2607 is longer than the set distance 806, the already set link 2404 is canceled and deleted from the screen. As previously described, if the object is moved, a link is created when the mouse is dropped (step S2110).

4-8 Link Setting Process (In Case where Object is Moved)

Figure 22A:
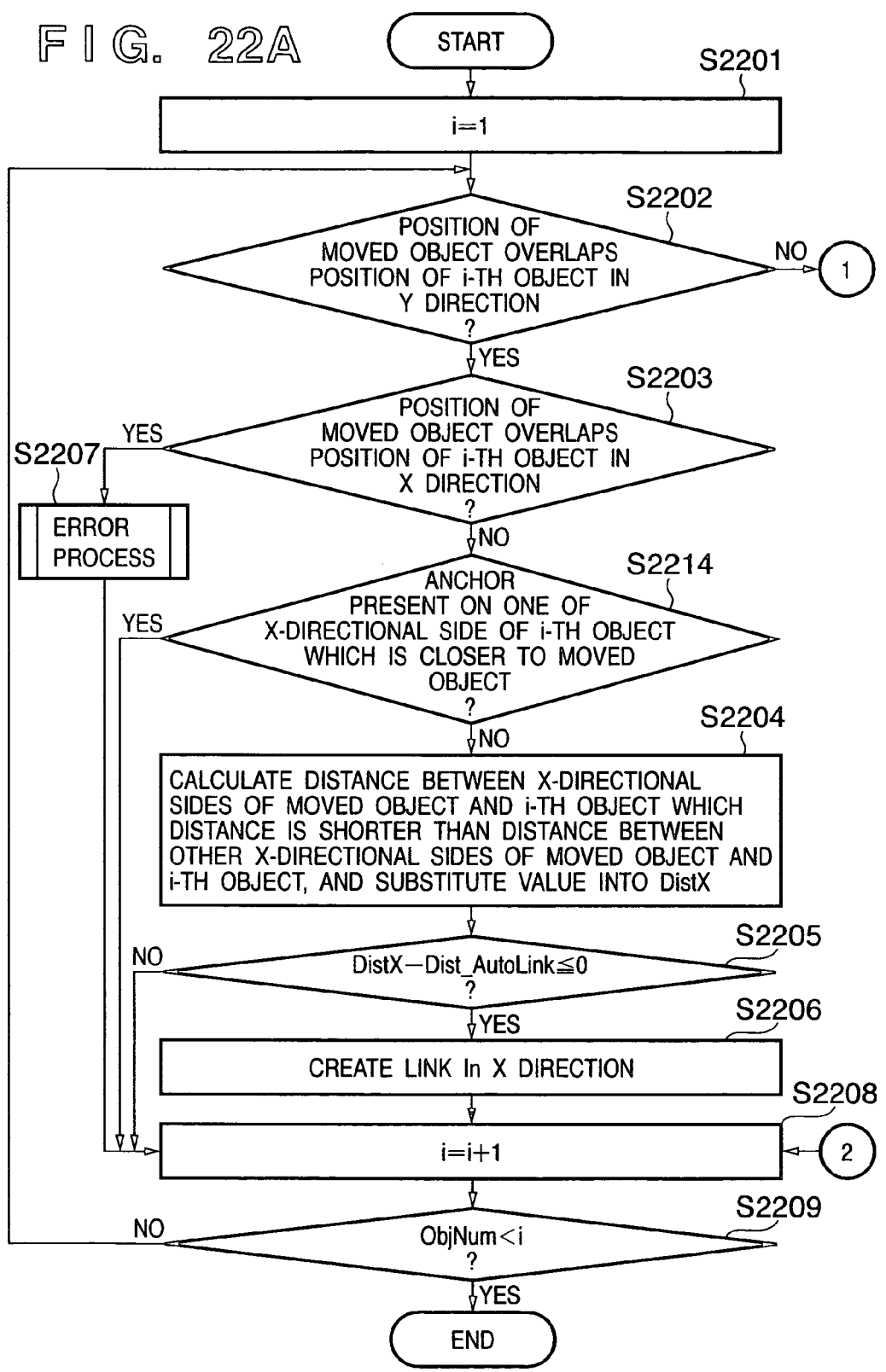
FIG. 22A is a flowchart showing the detailed flow of a link setting process.
Figure 22B:
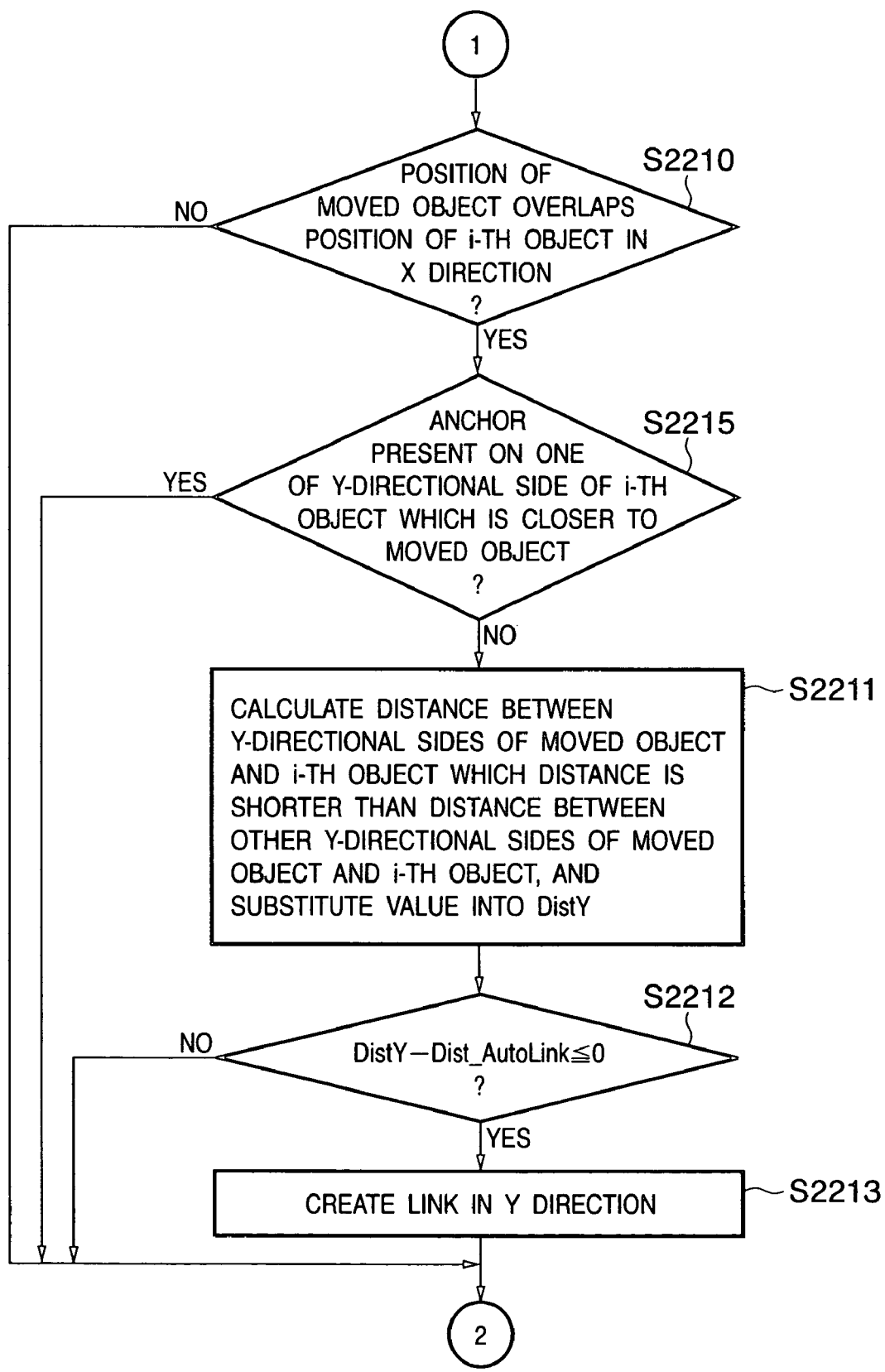
FIG. 22B is a flowchart showing the detailed flow of the link setting process.

FIGS. 22A and 22B are flowcharts showing the detailed flow of the link setting process (step S2109) in FIG. 21. The processing in FIGS. 22A and 22B is executed under the control of the processor 135 in the host computer 101. The steps are almost similar to those executed in creating a new object. The difference is that in steps S2206 and S2213, a temporary link is created which is required to finally establish a final link in step S2110 in FIG. 21. The other steps are the same as those executed in creating a new object, so that their description is omitted. If after movement of the object, the distance between the objects is determined to be at most the predetermined distance, a link is automatically created. This prevents the efficiency of the userts operations from being degraded in the edition of objects.

4-9 Error Process

Figure 17:
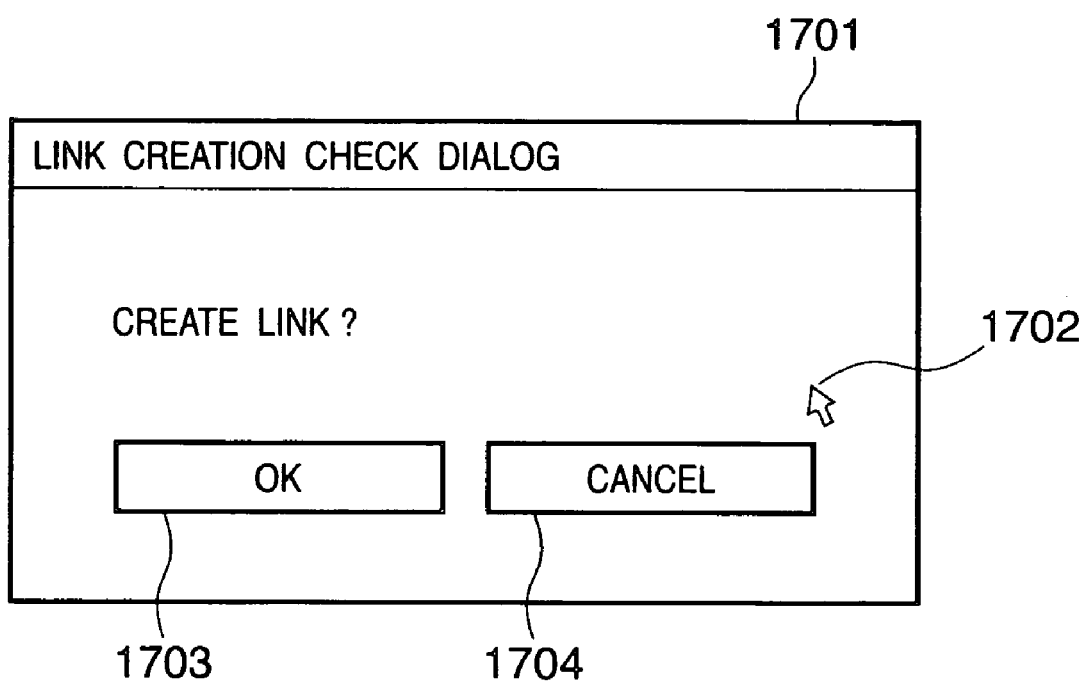
FIG. 17 is a diagram showing an example of a dialog window displayed if a created or moved object overlaps another object.

FIG. 17 shows an example of a dialog window 1701 displayed if a created or moved object overlaps another (as shown in FIG. 20). The dialog window is used to ask the user whether or not to create a link. A link is created by selecting a button 1703 used to continue a common process. No link is created when a button 1704 used to suspend the process is selected.

As is apparent from the above description, according to the automatic layout system according to the present embodiment, when the distance between adjacent objects is equal to or shorter than a predetermined distance, a link is automatically created. This prevents the burden for link setting from being increased in spite of an increase in the number of objects. It is thus possible to allow the user to efficiently perform a setting operation in the automatic layout system.

Other Embodiments

The present invention is applicable to a system composed of plural pieces of equipment (for example, a host computer, an interface apparatus, a reader, and a printer) or an apparatus consisting of one piece of equipment (for example, a copier or a facsimile machine).

Of course, the object of the present invention is accomplished by supplying a system or apparatus with a storage medium on which program codes for software that realizes the functions of the above embodiments and allowing a computer (or CPU or MPU) in the system or apparatus to read and execute the program codes stored in the storage medium.

In this case, the program codes read from the storage medium realize the functions of the above embodiments. The storage medium storing the program codes constitutes the present invention.

The storage medium used to supply the program codes may be, for example, a floppy (registered trade mark) disk, a hard disk, an optical disk, a magneto-optic disk, a CD-ROM, a CD-R, a magnetic tape, a nonvolatile memory card, or a ROM.

The functions of the above embodiments may be realized as follows instead of using the computer to execute the read program codes. An OS (Operating System) running on the computer executes a part or the whole of the actual process on the basis of instructions from the program codes.

The functions of the above embodiments may also be realized as follows. The program codes read from the storage medium are written to a memory provided in an expansion board inserted into the computer or an expansion unit connected to the computer. A CPU or the like provided in the expansion board or unit then executes a part or the whole of the actual process on the basis of instructions from the program codes.

The present invention is not limited to the above embodiments and various changes and modifications can be made within the spirit and scope of the present invention. Therefore to apprise the public of the scope of the present invention, the following claims are made.

CLAIM OF PRIORITY

This application claims priority from Japanese Patent Application No. 2004-231426 filed on Aug. 6, 2004, which is hereby incorporated by reference herein.

What is claimed is:

1. An information processing method for setting a constraint that associates a first data field with a second data field of a plurality of data fields on a document and for determining a layout including the first and second data fields based on the constraint when data is input into the first and second data fields, the method comprising:

a setting step of setting a distance between two of the plurality of data fields as a condition to determine whether to set the constraint, wherein the constraint associates the first and second data fields in a manner that, if a size of one of the first and second data fields on the document is changed in accordance with inputting the data, then the size of the other of the first and second data fields is changed;

a calculating step of calculating a distance between the first data field placed on the document and the second data field placed on the document;

a determining step of determining whether to set the constraint between the first and second data fields on the basis of the distance calculated in said calculating step and the distance set in said setting step; and a constraint setting step of, when said determining step determines that the constraint is to be set between the first and second data fields, setting the constraint between the first and second data fields.

2. The method according to claim 1, wherein said constraint setting step, if the first data field is newly set on the document, sets the constraint based on the distance calculated in said calculating step and the condition set in said setting step.

3. The method according to claim 1, wherein said constraint setting step, if the first data field is moved on the document, sets the constraint based on the distance calculated in said calculating step and the condition set in said setting step.

4. The method according to claim 1, wherein said determining step determines whether or not the distance between the first and second data fields is equal to or shorter than the distance set in said setting step, and said constraint setting step sets the constraint if said determining step determines that the distance between the first and second data fields is equal to or shorter than the distance as the condition set in said setting step.

5. The method according to claim 1, wherein said constraint setting step comprises a constraint type setting step that enables a type of the constraint set to be set.

6. The method according to claim 1, wherein said constraint setting step comprises a constraint size setting step that enables a size of the constraint set to be set.

7. The method according to claim 1, wherein if said determining step determines that a plurality of second data fields are equal to or shorter than the distance as the condition set in said setting step, said constraint setting step sets the constraint between the first data field and each of the plurality of second data fields.

8. The method according to claim 4, wherein even if said determining step determines that the distance calculated in said calculating step is equal to or shorter than the distance as the condition set in said setting step, if the constraint has already been set between the first data field and the second data field, said constraint setting step avoids setting a new constraint.

9. The method according to claim 1, further comprising a constraint canceling step of, if said determining step does not determine that the distance calculated in said calculating step is equal to or shorter than the distance as the condition set in said setting step and if the constraint has already been set between the first data field and the second data field, canceling the constraint set.

10. The method according to claim 1, further comprising a constraint retaining step of, if said determining step does not determine that the distance calculated in said calculating step is equal to or shorter than the distance as the condition set in said setting step and if the constraint has already been set between the first data field and the second data field, retaining the constraint set.

11. An information processing apparatus having a processor and a memory comprising a control unit configured to set a constraint that associates a first data field with a second data field of a plurality of data fields on a document and to determine a layout including the first and second data fields based on the constraint when data is input into the first and second data fields, the apparatus comprising:

a setting unit configured to set a distance between two of the plurality of data fields as a condition to determine whether to set the constraint, wherein the constraint associates the first and second data fields in a manner that, if a size of one of the first and second data fields on the document is changed in accordance with inputting the data, the size of the other of the first and second data fields is changed;

a calculating unit configured to calculate a distance between the first data field placed on the document and the second data field placed on the document;

a determining unit configured to determine whether to set the constraint between the first and second data fields on the basis of the distance calculated in said calculating unit and the distance set by said setting unit; and a constraint setting unit configured to, when said determining unit determines that the constraint is to be set between the first and second data fields, set the constraint between the first and second data fields.

12. The information processing apparatus according to claim 11, wherein said constraint setting unit, if the first data field is newly set on the document, sets the constraint based on the distance calculated by said calculating unit and the condition set by said setting unit.

13. The information processing apparatus according to claim 11, wherein said constraint setting unit, if the first data field is moved on the document, sets the constraint based on the distance calculated by said calculating unit and the condition set by said setting unit.

14. The information processing apparatus according to claim 11, wherein said determining unit determines whether or not the distance between the first and second data fields is equal to or shorter than the distance set by said setting unit, and said constraint setting unit sets the constraint if said determining unit determines that the distance between the first and second data fields is equal to or shorter than the distance as the condition set by setting unit.

15. The information processing apparatus according to claim 11, wherein said constraint setting unit comprises a constraint type setting unit that enables a type of the constraint set to be set.

16. The information processing apparatus according to claim 11, wherein said constraint setting unit comprises a constraint size setting unit that enables a size of the constraint set to be set.

17. The information processing apparatus according to claim 11, wherein if said determining unit determines that a plurality of the second data fields are equal to or shorter than the distance as the condition set by said setting unit, said constraint setting unit sets the constraint between the first data field and each of the plurality of second data fields.

18. The information processing apparatus according to claim 14, wherein even if said determining unit determines that the distance calculated by said calculating unit is equal to or shorter than the distance as the condition set by said setting unit, if the constraint has already been set between the first data field and the second data field, said constraint setting unit avoids setting a new constraint.

19. The information processing apparatus according to claim 11, further comprising a constraint canceling unit configured to, if said determining unit does not determine that the distance calculated by said calculating unit is equal to or shorter than the distance as the condition set by said setting unit and if the constraint has already been set between the first data field and the second data field, cancel the constraint set.

20. The information processing apparatus according to claim 11, further comprising a constraint retaining unit configured to, if said determining unit does not determine that the distance calculated by said calculating unit is equal to or shorter than the distance as the condition set by said setting unit and if the constraint has already been set between the first data field and the second data field, retain the constraint set.

21. A program stored in a computer-readable medium for causing a computer provided in an information processing apparatus to execute a method for setting a constraint that associates a first data field with a second data field of a plurality of data fields on a document, the information processing apparatus comprising a control unit configured to set the constraint and to determine a layout including the first and second data fields based on the constraint when data is input into the first and second data fields, the program causing the computer to execute:

a setting step of setting a distance between two of the plurality of data fields as a condition to determine whether to set the constraint, wherein the constraint associates the first and second data fields in a manner that, if a size of one of the first and second data fields on the document is changed in accordance with inputting the data, then the size of the other of the first and second data fields is changed;

a calculating step of calculating a distance between the first data field placed on the document and the second data field placed on the document;

a determining step of determining whether to set the constraint between the first and second data fields on the basis of the distance calculated in said calculating step and the distance set in said setting step; and a constraint setting step of, when said determining step determines that the constraint is to be set between the first and second data fields, setting the constraint between the first and second data fields.

22. The program according to claim 21, wherein said constraint setting step, if the first data field is newly set on the document, sets the constraint based on the distance calculated in said calculating step and the condition set in said setting step.

23. The program according to claim 21, wherein said constraint setting step, if the first data field is moved on the document, sets the constraint based on the distance calculated in said calculating step and the condition set in said setting step.

24. The program according to claim 21, wherein said determining step determines whether or not the distance between the first and second data fields are equal to or shorter than the distance set in said setting step, and said constraint setting step sets the constraint if said determining step determines that the distance between the first and second data fields is equal to or shorter than the distance as the condition set in said setting step.

25. The program according to claim 21, wherein said constraint setting step comprises a constraint type setting step that enables a type of the constraint set to be set.

26. The program according to claim 21, wherein said constraint setting step comprises a constraint size setting step that enables a size of the constraint set to be set.

27. The program according to claim 21, wherein if said determining step determines that a plurality of the second data fields are equal to or shorter than the distance as the condition set in said setting step, said constraint setting step sets the constraint between the first data field and each of the plurality of second data fields.

28. The program according to claim 24, wherein even if said determining step determines that the distance calculated in said calculating step is equal to or shorter than the distance as the condition set in said setting step, if the constraint has already been set between the first data field and the second data field, said constraint setting step avoids setting a new constraint.

29. The program according to claim 21, further comprising a constraint canceling step of, if said determining step does not determine that the distance calculated in said calculating step is equal to or shorter than the distance as the condition set in said setting step and if the constraint has already been set between the first data field and the second data field, canceling the constraint set.

30. The program according to claim 21, further comprising a constraint retaining step of, if said determining step does not determine that the distance calculated in said calculating step is equal to or shorter than the distance as the condition set in said setting step and if the constraint has already been set between the first data field and the second data field, retaining the constraint set.

* * * * *

UNITED STATES PATENT AND TRADEMARK OFFICE
CERTIFICATE OF CORRECTION

PATENT NO.       : 7,373,593 B2
APPLICATION NO.  : 11/190872
DATED            : May 13, 2008
INVENTOR(S)      : Takayuki Uchida It is certified that error appears in the above-identified patent and that said Letters Patent is hereby corrected as shown below:

FRONT PAGE:
At line (56) FOREIGN PATENT DOCUMENTS, Delete "JP 2002-276608 10/2000" (first occurrence).
At line (74) Attorney, Agent, or Firm, "Fitzpatrick Cella Harper & Scinto" should read --Fitzpatrick, Cella, Harper & Scinto--.

COLUMN 1:
Line 28, "ages, sexes," should read --age, sex,--.
Line 28, "histories" should read --history--.
Line 36, "contents" should read --contents,--.

COLUMN 2:
Line 55, "step and" should read --step; and ¶--.

COLUMN 4:
Line 39, "executes" should read --executing--.

COLUMN 5:
Line 32, "CR-ROM" should read --CD-ROM--.

COLUMN 8:
Line 10, "provides a displays" should read --provides a display of--.

COLUMN 10:
Line 16, "The" should read --the--.

COLUMN 12:
Line 55, "on" (second occurrence) should read --in--.

COLUMN 14:
Line 9, "in which" should read --which is--.
Line 26, "increment i-th" should read --increment i--.
Line 32, "X" should read --Y--.
Line 36, "set" should read --set on--.
Line 45, Delete "compares the".

UNITED STATES PATENT AND TRADEMARK OFFICE
CERTIFICATE OF CORRECTION

PATENT NO. : 7,373,593 B2
APPLICATION NO. : 11/190872
DATED : May 13, 2008
INVENTOR(S) : Takayuki Uchida It is certified that error appears in the above-identified patent and that said Letters Patent is hereby corrected as shown below:

COLUMN 15:
Line 5, "is moved" should read --are moved--.

COLUMN 16:
Line 3, "application-then" should read --application then--.
Line 37, "userts" should read --user's--.
Line 38, "edition" should read --editing--.

COLUMN 19:
Line 25, "by" should read --by said--.
Line 26, "infonnation" should read --information--.
Line 30, "infonnation" should read --information--.

Signed and Sealed this

Seventeenth Day of February, 2009

JOHN DOLL
*Acting Director of the United States Patent and Trademark Office*